United States Patent
Bland, Jr.

(10) Patent No.: US 10,417,898 B1
(45) Date of Patent: Sep. 17, 2019

(54) LOCATING AND SIGNALING DEVICE, SYSTEM AND METHOD

(71) Applicant: BIZLIFE, LLC, Winter Park, FL (US)

(72) Inventor: G. Thomas Bland, Jr., Winter Park, FL (US)

(73) Assignee: BizLife, LLC, Winter Park, FL (US)

( * ) Notice: Subject to any disclaimer, the term of this patent is extended or adjusted under 35 U.S.C. 154(b) by 0 days.

(21) Appl. No.: 15/215,021

(22) Filed: Jul. 20, 2016

Related U.S. Application Data

(60) Provisional application No. 62/194,481, filed on Jul. 20, 2015.

(51) Int. Cl.
G08B 1/08 (2006.01)
G08B 25/01 (2006.01)
G08B 15/02 (2006.01)
H04W 4/90 (2018.01)

(52) U.S. Cl.
CPC ........... *G08B 25/016* (2013.01); *G08B 15/02* (2013.01); *H04W 4/90* (2018.02)

(58) Field of Classification Search
CPC ......... G08B 25/016; G08B 21/02; G08B 1/08
USPC .............. 340/539.13, 539.17, 573.1, 539.11, 340/572.1–572.9
See application file for complete search history.

(56) References Cited

U.S. PATENT DOCUMENTS

| | | |
|---|---|---|
| 4,706,689 A | 11/1987 | Man |
| 5,258,746 A | 11/1993 | Leitten et al. |
| 5,429,301 A | 7/1995 | Franks |
| 5,517,180 A | 5/1996 | Masi et al. |
| 5,629,678 A | 5/1997 | Gargano et al. |
| 5,760,692 A * | 6/1998 | Block ............... G08B 21/0288 340/505 |
| 6,239,705 B1 | 5/2001 | Glen |
| 6,272,781 B1 | 8/2001 | Resnick |
| 6,317,049 B1 | 11/2001 | Souhail |
| 6,771,186 B1 | 8/2004 | Boveja et al. |
| 6,828,908 B2 | 12/2004 | Clark |
| 6,888,464 B1 | 5/2005 | Maloney |
| 7,486,798 B2 * | 2/2009 | Anjanappa ............. H04R 17/02 381/151 |

(Continued)

OTHER PUBLICATIONS https://m.youtube.com/watch?v=sCli18ChRqo, "Vintage Tear Gas Pen Demonstration," Uploaded Jul. 28, 2009.

(Continued)

*Primary Examiner* — Phung Nguyen
(74) *Attorney, Agent, or Firm* — Erica M. Cipparone; Beusse Wolter Sanks & Maire, PLLC

(57) ABSTRACT

Systems, methods and devices for hands-free signaling for tracking, locating and/or monitoring a person are provided in embodiments herein. A system including a portable signaling unit comprising an intra-oral element and a sensor for detecting a compressive force from a user is provided in an embodiment herein. The portable signaling unit may be configured to generate a signal in response to the compressive force detected, in one embodiment. The embodiment further includes a relay device configured to transmit a signal from the sensor, a receiver configured to detect the signal from the relay device, and a processor enabled to receive a signal from the receiver, wherein the signal is used to identify and provide information about a location of the portable signaling unit.

4 Claims, 19 Drawing Sheets

(56) References Cited

U.S. PATENT DOCUMENTS

| | | | |
|---|---|---|---|
| 7,551,079 B2 | 6/2009 | Ortelle | |
| 8,823,491 B2 | 9/2014 | Luke et al. | |
| 9,471,059 B1 | 10/2016 | Wilkins | |
| 2002/0008620 A1* | 1/2002 | Whalen | G08B 15/004 340/540 |
| 2002/0137493 A1 | 9/2002 | Dutta | |
| 2003/0003926 A1 | 1/2003 | Peters et al. | |
| 2006/0043164 A1 | 3/2006 | Dowling et al. | |
| 2006/0097007 A1 | 5/2006 | Motyka et al. | |
| 2009/0042534 A1 | 2/2009 | Levanen | |
| 2009/0088140 A1 | 4/2009 | Caspi | |
| 2009/0237236 A1* | 9/2009 | Maassarani | G01S 19/39 340/539.13 |
| 2010/0238042 A1 | 9/2010 | Paul | |
| 2011/0046920 A1 | 2/2011 | Amis | |
| 2011/0059769 A1 | 10/2011 | Brunolli | |
| 2012/0194976 A1 | 8/2012 | Golko et al. | |
| 2013/0088352 A1 | 4/2013 | Amis | |
| 2013/0294005 A1 | 11/2013 | Garaycochea | |
| 2014/0057610 A1 | 2/2014 | Olincy et al. | |
| 2014/0118140 A1* | 5/2014 | Amis | G08B 25/08 340/539.13 |
| 2014/0120983 A1 | 5/2014 | Lam | |
| 2014/0283430 A1 | 9/2014 | Allen et al. | |
| 2015/0065082 A1 | 3/2015 | Sehgal | |
| 2015/0255871 A1* | 9/2015 | Baringer | A61B 5/0002 343/702 |
| 2015/0366504 A1* | 12/2015 | Connor | A61B 5/6804 600/301 |

OTHER PUBLICATIONS https://www.indiegogo.com/projects/bioringthepersonaltraineronyourfingerfitnessgadget#/l/36Explore, uploaded Apr. 16, 2017.
http://www.bestbuy.com/site/jvc68cddvdbuiltinbluetoothapplecarplayindashreceiverblack/4970400.p?skuId=4970400, uploaded Apr. 16, 2017.
http://mymotiv.com, uploaded Apr. 16, 2017.
http://nfcring.com, uploaded Apr. 6, 2017.
https://ringly.com, uploaded Apr. 6, 2017.
https://sirenring.com/collections/all, uploaded Apr. 6, 2017.
https://www.wareable.com/smartjewellery/bestsmartrings1340, uploaded Apr. 6, 2017.
https://www.indiegogo.com/projects/smartyring3#, uploaded Apr. 6, 2017.
http://www.moodmetric.com, uploaded Apr. 6, 2017.
http://thehightechsociety.com/bluetoothorbstatus, uploaded Apr. 6, 2017.
http://thehightechsociety.com/smartring, uploaded Apr. 6, 2017.

* cited by examiner

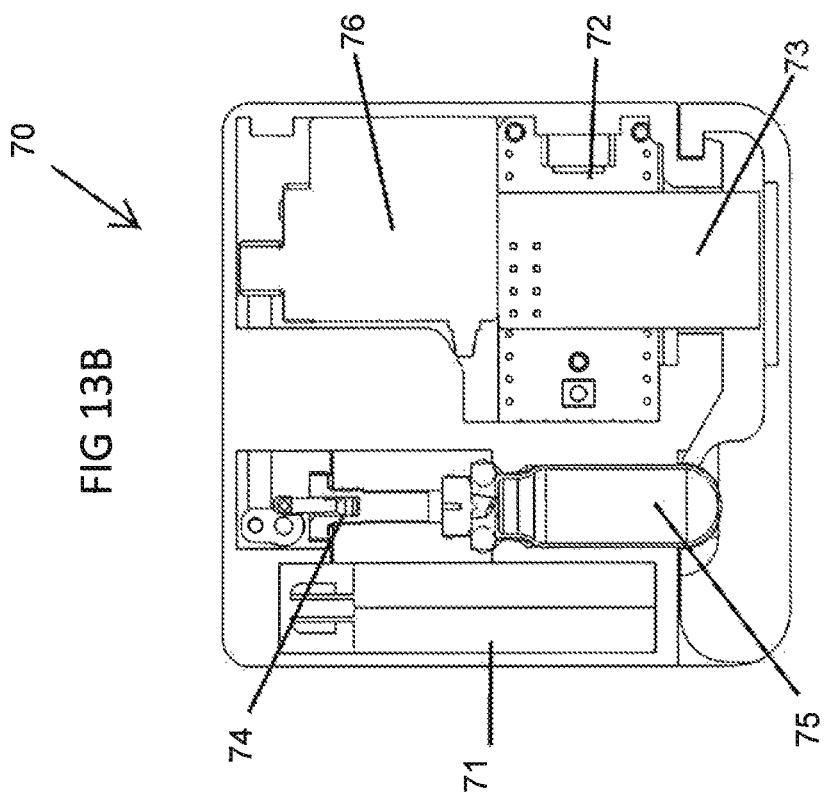
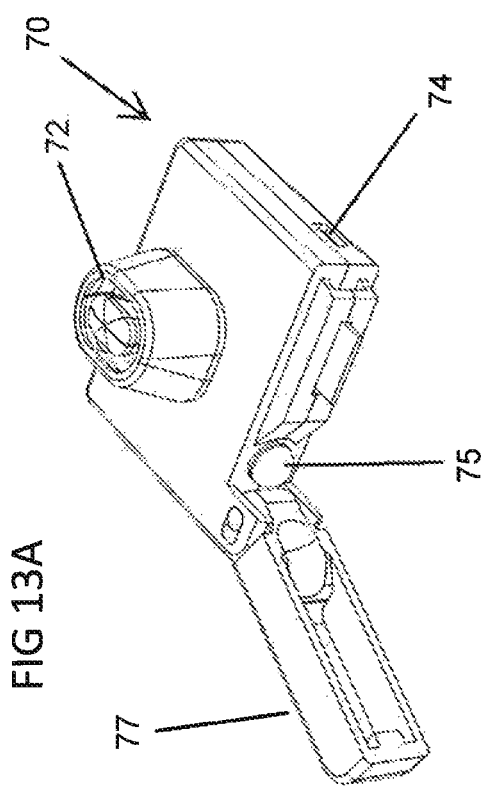
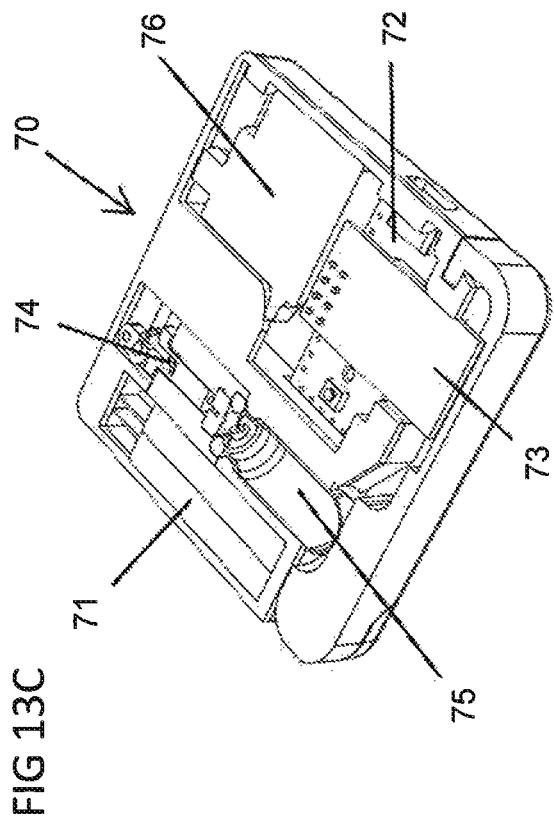

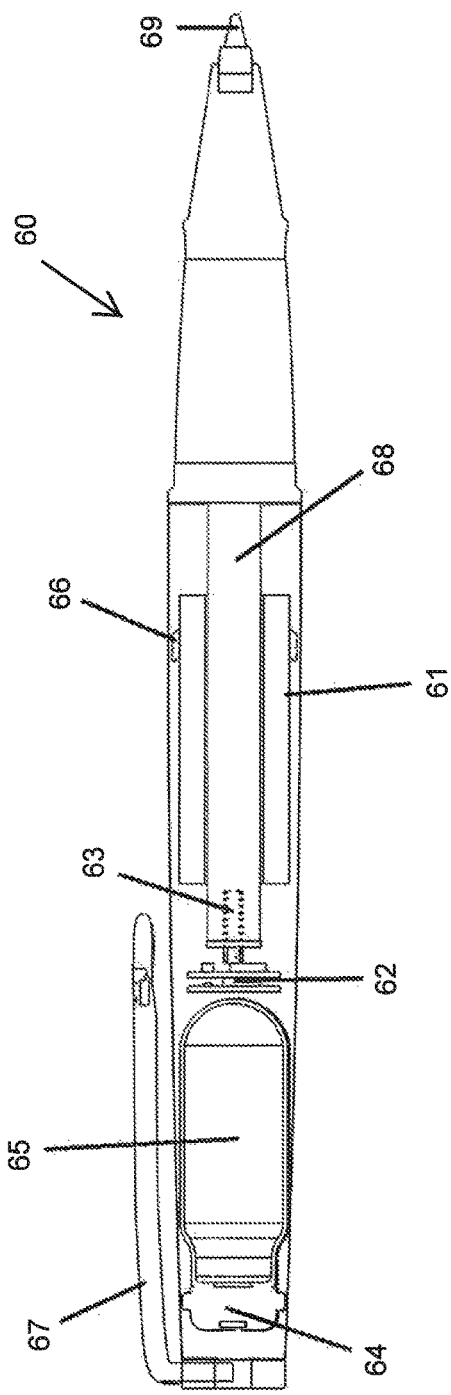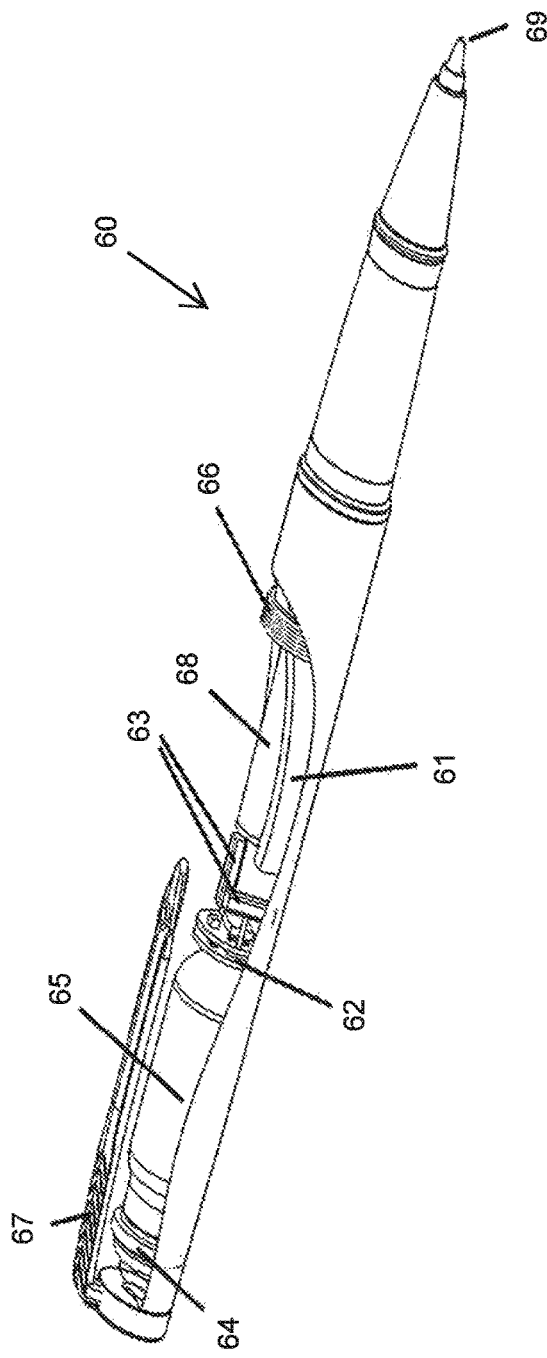
FIG 14A
FIG 14B

LOCATING AND SIGNALING DEVICE, SYSTEM AND METHOD

CROSS-REFERENCE TO RELATED APPLICATIONS

This application claims the benefit of U.S. Provisional Application No. 62/194,481 filed Jul. 20, 2015, and incorporated herein by reference in its entirety.

BACKGROUND

Tracking systems are useful in locating lost persons, however the systems currently available require components that are easily identified and removable by a potential assailant. Furthermore, current devices are not capable of providing signaling to authorities for location tracking. Current solutions to these problems include distress radio beacons, also known as emergency beacons, PLB (Personal Locator Beacon), ELT (Emergency Locator Transmitter) or EPIRB (Emergency Position-Indicating Radio Beacon). These tracking transmitters aid in the detection and location of boats, aircraft, and people in distress. Strictly, they are radio beacons that interface with the international satellite system for search and rescue (SAR). When activated these beacons send out a distress signal. The signals are monitored worldwide and the location of the distress is detected by non-geostationary satellites and then located by some combination of GPS trilateration and Doppler triangulation. These distress radio beacons are used to help rescuers locate survivors within the first 24 hours following a traumatic event—the time frame during which a majority of survivors can be saved.

However, no current solution exists for tracking, locating and/or monitoring or defending a person by way of a hands-free signaling system, which is useful during a time of distress. Furthermore, there is a need for a covert communications system in various disciplines. Communications made covertly can streamline many activities or reduce dangerous distractions by allowing ongoing communications while conducting these activities. Additionally, there is often a need for identifying a user of a system by means other than the often used password identification.

SUMMARY

In one embodiment, a system including a portable signaling unit comprising an intra-oral element and a sensor for detecting a compressive force from a user is provided. The sensor is configured to generate a signal in response to the compressive force detected. The embodiment further includes a relay device configured to transmit a signal from the sensor, a receiver configured to detect the signal from the relay device, and a processor enabled to receive a signal from the receiver, wherein the signal is used to identify and provide information about a location of the portable signaling unit, and a power source.

In another embodiment, a system is provided including an electromyography sensor for detecting a skeletal muscle movement of a user, wherein the sensor generates a signal in response to the skeletal muscle movement detected, a relay device configured to transmit a signal based on the signal received from the sensor, a receiver configured to receive the signal from the relay device and provide information about a location of the portable signaling unit based on the signal received, and a power source.

In a further embodiment, a device is provided, wherein the device includes a portable signaling unit configured to be positioned intra-orally, the portable signaling unit including a sensor, wherein the sensor is configured to detect a pressure received, a touch or movement across the sensor by the portable signaling unit, and generate a signal in response there to, or in lack of a signal there to, for example using passive RFID, wherein the relay device would cease receiving a signal from the sensor. The device further includes a relay device associated with the portable signaling unit, the relay device being configured to transmit a signal comprising information about a location of the portable signaling unit to a receiver, and a power source.

In still a further embodiment, a method for locating a user is provided. The non-limiting method embodiment includes detecting a compressive force with an intraoral sensor on the user, transmitting a signal in response to the compressive force detected, receiving the signal at a receiver, and based on the signal received by the receiver, identifying a location of the user.

BRIEF DESCRIPTION OF DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIGS. 13A-13C include perspective and cross sectional views of a further embodiment of a defender, a mini-defender;

FIG. 14A includes a side cross sectional view of a pen defender embodiment;

FIG. 14B is a perspective partial cut-away view of the pen defender embodiment of FIG. 14A;

DETAILED DESCRIPTION

Figure 1:
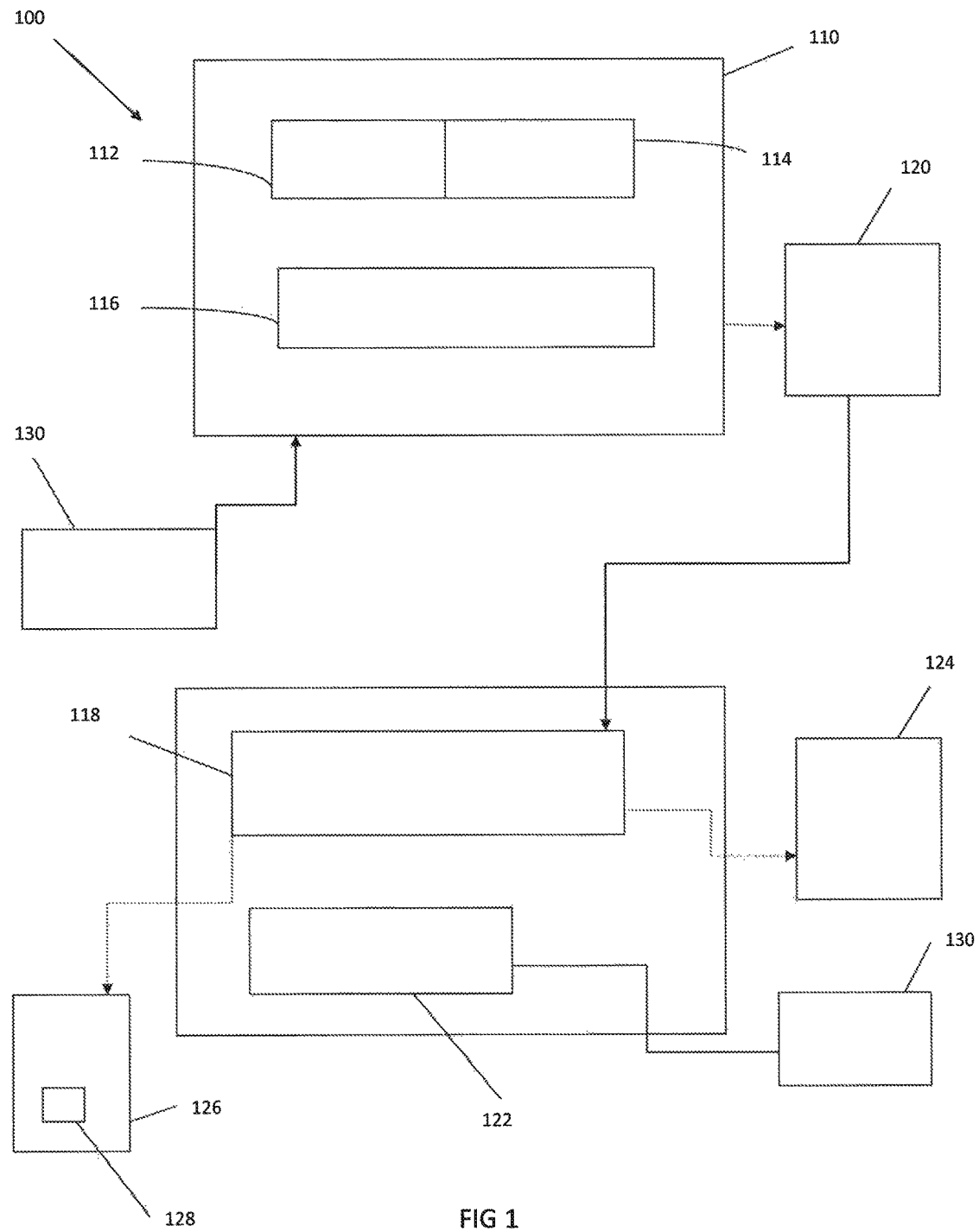
FIG. 1 is a block diagram of a system embodiment provided herein.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

The terminology used herein is for the purpose of describing particular embodiments only and is not intended to be limiting. As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another.

The term "sensor" as used herein, includes but is not limited to, a piezoresistive strain gauge, configured to detect strain due to applied pressure. A piezoresistive strain gauge uses the piezoresistive effect of bonded or formed strain gauges to detect strain due to applied pressure. Common technology types include Silicon (Monocrystalline), Polysilicon Thin Film, Bonded Metal Foil, Thick Film, and Sputtered Thin Film. In some embodiments, the strain gauges are connected to form a Wheatstone bridge circuit to maximize the output of the sensor and to reduce sensitivity to errors. The piezoresistive strain gauge may be used for its sensing technology to detect and/or measure pressure. The strain gauge may further be used to measure absolute, gauge, vacuum, and differential pressures. Other sensors that may be used, alternatively or in addition to a strain gauge sensor, include but are not limited to, contact sensors, proximity sensors, accelerometers, a temperature sensor, and any other sensor known to those skilled in the art to which the invention pertains. In other embodiments, in addition to or as an alternative to one or more sensors, a mechanical actuation component may be used to initiate a signal. In one example, mechanical activation may occur by way of a mechanical switch or other mechanical feature known to those skilled in the art.

The terms "Smartphone application" and "cellular or cell phone application" as used interchangeably herein refer to a mobile application, which is a software application designed to run on mobile devices such as smartphones, tablet computers, a "mother", etc., as known in the art. The software may be pre-installed software, or may be installed post purchase of the device on which the mobile application is run, in some non-limiting examples.

The term "communicatively connected" as used herein includes wired or a wireless connection. Wireless connection includes, but is not limited to Radio Frequency Identification (RFID) communications, Bluetooth® communications, cellular communications, Wi-Fi communications, among other types of wireless communications know to those skilled in the art. Various types of cellular communications include, for example, 3G or LTE cellular networks may be used herein. Another type of cellular communication includes, for example, Sigfox. Sigfox provides for transmitting with very little power, and consequently Sigfox allows devices to run for long periods of time on a very small battery, for example.

Various embodiments of portable signaling devices may be used herein. One portable signaling device described herein is an intra oral device. In other embodiments, the portable signaling device may include a piece of jewelry which may be worn by the user or a chip which may be removably affixed to the user as described in more detail herein. The portable signaling devices may include one or more responsive elements responsive to user input.

The terms "responsive element", "responsive member" and "responsive device" as used interchangeably herein, refer to a responsive member that is reactive to user input. The responsive member may include a button (mechanical or digital), a switch, a sensor, or any other type of responsive device that may be reactive to user input.

Embodiments provided herein may provide instant and hands free communications between a user of the system or device and another for use in locating the user, in a non-limiting embodiment. In some instances, the embodiments provided herein will provide communications to deter an assailant. In other instances, the user's location may be communicated to a third party, in some instances this third party may be positioned at a remote location. Features of certain non-limiting embodiments provided herein may allow law enforcement officials to subdue an offender without having to use deadly force, for example. Some other non-limiting embodiments provided herein may allow military maneuvers to be conducted against terrorists without harming innocent by-standers.

Implications of some of the embodiments described herein may include freeing people from bullies, assailants, or others with criminal intentions. The device and system embodiments described herein will provide a sense of security to users thereof. Embodiments of the system may use received signals from one or more access points located in a predetermined area in order to receive the wireless communication signals. These signals can be triangulated in order to determine position within the area, in a non-limiting embodiment. In other non-limiting embodiments, the signals can be trilaterated, wherein the absolute or relative location of the device and/or sensor can be determined using a measurement of distances. In other non-limiting embodiments, the location of a user can be determined by referring to geolocation based on the received signals.

In other non-limiting embodiments, means for communicating covertly may be provided herein. These communications can occur by way of an intra-oral device, located for example on the retro-molar pad, on a portion of the pallet of a mouth of a user, or on the gums of the user, or otherwise situated intra-orally in a way such that the user can use the device to send a signal and communicate covertly, for example. In some embodiments, these devices may include a power source, either active or passive, such as coated batteries or a capacitor, in some non-limiting embodiments. These devices may communicate with a communicative device, also known as a "mother" device, wherein this communicative device may transmit or retransmit a signal received from the intraoral device. This communicative device may therefore receive signals or information from the intraoral device or from an external device, i.e., a device external to the system described herein, such as a cellular phone of a third party, campus police monitoring device, or police station system, in non-limiting examples. The communicative device may provide a longer range signaling capability than that of the intra oral device in some instances. In other alternative embodiments, in conjunction with the intra oral device, or in place of the intra oral device, a piece of jewelry (i.e., a ring) can be used to communicate signals. The jewelry may include a multi-way switch, and a power source to provide communication with the communicative device, or "mother". The mother device may be able to send signals to an ADT, a campus police, local police, a parent or loved one, or a monitoring agency, in non-limiting examples.

Other embodiments of the invention may include a defender used as an active deterrent, wherein when worn by a user may deter an attacker upon activation. Activation may be by means of activation of the intraoral device or jewelry described above, in non-limiting examples. Activation of the signaling device (intraoral or jewelry) may send a signal to either of the mother device to activate the defender, or direct activation from a signal sent by the signaling device directly to the defender. The defender may be any device that may emit a chemical (including a gas), a sound, smoke, or an electrical current to deter a potential attacker. The defender may include any type of housing, such as a pen, a poker chip, a lapel pin, a necklace, a broach, glasses retainer (i.e., Croakies) or any device having an adhesive on a portion thereof suitable to adhere the defender to the user. The adhesive may be removable and replaceable. The defender can be worn on the arm, chest, or back of the neck of the user, in non-limiting embodiments, and may be designed in such a way that it is disguised, for example, by appearing as a removable tattoo, including a school logo, or any other design. In some embodiments, the defender may be worn as a lapel pin, and therefore may be disguised from potential attackers. The defender may include a cartridge-containing chemical to be emitted upon activation of the defender. In some embodiments wherein the defender emits a gas, the defender may include a gas cartridge or bladder to house a gas to be emitted and a valve assembly or puncture assembly used to emit the gas from the gas cartridge or bladder, in non-limiting examples, wherein contents may be under pressure. The defender may further include a servo motor or solenoid, a power source (i.e., a battery) a radio for communications to and from the defender and a control board or processor. Upon activation of the defender, a chemical emission, or a sound may be dispersed from the defender to deter an attacker. The sound may be a very loud ear-piercing sound (wherein noise-blocking ear buds (see FIG. 10, for example) would be worn by the user to protect the ears of the user), or a high-pitched sound, in order to deter a potential attacker nearby.

Other embodiments include a security system used to identify the user as such. The security system may include a communicative device, or "mother" device wherein to gain access to any secure system, the mother device may require a user to provide a code, which may be in a non-limiting example, a six out of ten digit code coupled with a biometric requirement, which would require two of any ten finger prints randomly selected by the mother device to activate the device. The combination of the code and biometric requirement, or either the code or the biometric requirement would be required to log into the device, to use the device or an associated or connected device or system or to be granted access to another network or system. This could be used with any secure Internet system. The security system would further be useable with DNA identification means to identify the user as such. Lab-on-a-chip (LOC) or nanopore technology may be used to identify a user by obtaining saliva or other biological material from the user and use the DNA obtained there from to identify the user as such. These methods will be used to positively identify the user through the mother device with complete accuracy with the use of DNA identification.

Nanopore technology uses a nano-scale hole, wherein an ionic current is passed through the nanopore and changes in current as the biological molecule passes through or near the nanopore is measured. The technology distinguishes between the DNA bases, guanine, cytosine, adenine, and thymine, and modified bases as well. It is used to identify a user based on the users' DNA.

LOC technology includes a device, which can be miniaturized and provides high-throughput screening. A LOC can receive a very small biological sample from a user and provide quick analysis of the biological sample received thereon. These biological data gathering/obtaining devices may be included in the intra-oral device embodiments as described herein, and may be used to identify the correct user of the system before the system may be activated.

In a further non-limiting embodiment, the intra-oral device may include one or more projections provided to obtain tissue sample and/or DNA-containing material from a user once placed in the mouth of the user. This information may be stored on the intra-oral device and/or compared to information previously obtained from the user to identify the user as the correct user for the intra-oral device, enabling the user to operate the intra-oral device or associated or connected devices or systems or to be granted access to another network or system. The comparison information may include a database of the user's entire genome, previously stored. The information previously stored may be stored on a communicative device, which may be in communication with the intra-oral device in some, non-limiting embodiments.

In one non-limiting embodiment, a cellular phone may communicate with the intra-oral device by way of a cellular phone application. The system may be used to receive and transmit information, in some embodiments, or to only passively receive information or only transmit information in a covert method. The cellular phone application will allow a user to select groups of persons on a "known" receiver list, for example, a preselected group of contacts, which may be selected based on a user's contact list, in some non-limiting embodiments. The application may differentiate text messages received by those on the contact list of the cellular phone and messages received by those not on the contact list of the user. The application may be provided such that only messages received from those on the users contact list will be provided to the user in one example. The application can convey messages over an earbud or bone conduction device, in a non limiting embodiment, to the wearer of the earbud or bone conduction device and the wearer may either accept or deny the communication by way of the intraoral device, or a jewelry device, for example.

Upon receipt of a text message via MMS or SMS, or upon receipt of a phone call, the text information may be read to the user via the application and the information of the phone call may be translated to text or relayed in the caller's own voice and communicated to the user via the cell phone application. The user may hear the textual information provided to the user via the cellular phone speaker, or may be provided through an earbud or bone conduction device worn by the user. The earbud or bone conduction device may be sufficiently small so as to maintain the covert communication. The earbud or bone conduction device may be wirelessly connected to the system. The user of the system may be able to provide "yes" or "no" answers in response to the information being provided to the user from the third party via text or by phone call through the cellular phone application. The "yes" or "no" answers may be communicated by the intra oral device, by directional movement across a contact point on the intra oral device (this may be communicated by movement of the users tongue across the device, for example). These inputs by a user may be communicated, by wired or wireless communication to the cellular phone for response to the third party via the cellular phone application. In other embodiments, a piece of jewelry, such as a ring worn by the user, in a non-limiting embodiment, may be used in place of the intra-oral device and may be used to respond to a textual or audio-to-textual (or speech-to-text) message by selecting a responsive member, responsive to user input to answer yes/no questions in some examples. Both the cellphone and communicative device, or "mother" device would receive prompts from the ring, intra-oral device, buttons already built into a headphone worn by the user, or buttons on the phone itself or a "mother" device. The type of message can range from texts, phone calls, voicemails, social media notifications, weather and traffic updates, appointment reminders and much more. In other embodiments, the earbud or bone conduction device can be used to play music, television or other streaming content in a covert manner not noticeable to others surrounding the user, and only heard by the user with the use of noise-canceling technology, for example. In some embodiments, the user uses a responsive member, reactive to user input on either the intraoral device or jewelry device to indicate a "yes" or a "no" to hearing the message. The responsive member may include a sensor, a button, or any other type of element known to those skilled in the art reactive to user input. The message received may then be provided to the user over the ear bud or bone conduction device and the user may interact with limited "yes," "no" or "maybe" and messages are relayed through the cell phone application. Provided below is an example of a use of the system (additional examples are provided in flow charts provided in FIGS. 15-16):

A call comes in and the system alerts the user who is contacting them. The user chooses to accept communication or send it to voicemail. Once they accept communication a conversation can be relayed like this:

To user: There is a call from, Caller.
Call is accepted.
To Caller: User, is unavailable may I relay yes/no/maybe questions to him on your behalf or would you like his voicemail?
Caller chooses to message.
To User: Will you be home for dinner at 5 PM?
The User answers: Yes.

Some of the many benefits of the application include the ability to conduct covert communications without alerting surrounding persons that communications are being conducted between the user and a third party. The system allows a user to make communications with a third party without interrupting a meeting, a movie, a dinner, meeting, jury duty, or a conference, for example.

In another non-limiting embodiment, the communicative device, or "mother" device, may be used in place of a cell phone and may receive and transmit information receivable in an MMS or SMS format, for example, or may translate the information audibly received from a third party to a textual format, and may be audibly provided to the user. The communicative device may include a communication converter, which may include a speech receiving means to receive audio or textual information and establish a messaging session. Speech-to-text conversion acts to convert audio information from the speech receiving means into corresponding textual information. A textual information output provides the textual information directly to the user via the cellular phone speaker or via a wired or wireless communication to a headphone, ear bud or bone conduction device located in proximity to the users' ear, temple or other bones of the skull. The communicative device may be associated with at least one controller to receive commands from an intelligent gateway for coordinating connections to and from the speech receiving means and the speech to text conversion means.

The system would allow for the communication of certain types of notifications, for example, only those from a preselected group of contacts. The application would covey the messages to the user, for example, by way of an ear bud. Numerous types of earbuds known to those skilled in the art include Bluetooth® enabled technology or other wireless technology to transmit data and information to a user wearing the earbud. Other types of earbuds include a wired-connection.

In one embodiment, a system including a portable signaling unit comprising an intra-oral element and a sensor for detecting a compressive force from a user is provided. The sensor is configured to generate a signal in response to the compressive force detected. The embodiment further includes a relay device configured to transmit a signal from the sensor, a receiver configured to detect the signal from the relay device, and a processor enabled to receive a signal from the receiver, wherein the signal is used to identify and provide information about a location of the portable signaling unit, and a power source.

In one embodiment the sensor comprises a piezoresistive strain-gauge sensor. The portable signaling unit and/or the relay device comprises a radio frequency identification device (RFID) tag, and the receiver includes a radio frequency identification device (RFID) reader in one embodiment. In one embodiment, the RFID tag is a passive RFID tag, and the RFID reader comprises the power source, wherein said RFID reader is configured to power the RFID tag. IN another embodiment the RFID tag comprises an active RFID tag, and the active RFID tag comprises the power source. The processor may receive signals from three or more receivers, the processor comprises a triangulation and/or trilateration means to determine a location of the portable signaling unit within a predetermined area.

In an embodiment, the relay device is a component of the portable signaling unit. In another embodiment the relay device includes a transceiver to receive a signal from the sensor, and to send a signal to the receiver. In a non-limiting embodiment, an extra-aural device is provided, the extra-aural device including the transceiver. In still a further embodiment, the system includes further comprising an unmanned aerial vehicle (UAV) to receive a signal from the relay device wherein said UAV is activated upon receipt of the signal. In one non-limiting embodiment the relay device and the receiver are connected by wireless communication. The relay device may be connected to the intraoral device by wired or wireless connection. The relay device may be coupled or connected to a Smartphone application and configured to communicate information to and receive information from the Smartphone application. The Smartphone application may include programming for dialing 911 when initiated by a signal via the intra oral device activatable by a user. In a further embodiment, the receiver includes a GPS receiver, said GPS receiver being operably connected to the portable signaling unit and a GPS antenna to receive signals from a GPS system.

In a further embodiment a system includes an electromyography sensor for detecting a skeletal muscle movement of a user, wherein the sensor generates a signal in response to the skeletal muscle movement detected; a relay device configured to transmit a signal based on the signal received from the sensor, a receiver configured to receive the signal from the relay device and provide information about a location of the portable signaling unit based on the signal received; and a power source. The electromyography sensor may detect movement of the masseteric, pterygoid and/or buccinators muscles. The electromyography sensor and/or the relay device comprise a radio frequency identification device (RFID) tag, and the receiver comprises a radio frequency identification device (RFID) reader. The RFID tag may be passive, and the RFID reader may include the power source, such that the reader can power the tag in a non-limiting embodiment. The relay device may include a transceiver configured to receive the signal from the sensor and transmit the signal to the receiver, wherein the transceiver is configured to extend the range of the signal generated. In an embodiment, the signal may be transmitted to a Smartphone application, said Smartphone application being configured to initiate a response, wherein the response comprises an output from the Smartphone or a signal to an external device.

In a further embodiment, the system may include an unmanned aerial vehicle configured to receive a signal from the sending unit wherein the UAV is activated upon receipt of the signal. The sensor and receiver may be connected by a wireless connection.

Turning to the drawings, in one non-limiting embodiment as shown in FIG. 1, a system 100 for tracking a user having a portable signaling unit 110 is disclosed. In one particular non-limiting embodiment, the portable signaling unit 110 may include an intraoral device 112. In a non-limiting embodiment, the portable signaling unit 110 may include a sensor 114 for activation by a user, wherein activation of the sensor 114 may occur by compression of a portion of the sensor 114 (for example, a piezoelectric strain gauge sensor), in a non-limiting embodiment. Activation of the sensor 114 may generate and transmit a signal from the portable signaling unit 110 via a relay device 116, which may be received by a receiver 118.

A receiver may receive a signal. The receiver may be a part of the mother device in some, non-limiting embodiments. In other non-limiting embodiments, the receiver may be part of a defender device. Examples of receivers include the mother device, a defender device, a cell phone or another wireless gateway device on or about a person, an access point, Bluetooth or other wireless base station in a campus like environment, or any existing cellular or wireless network, in non-limiting examples. Such a receiver device may receive a signal from a sensor and cause an action to be completed. In non-limiting examples, actions may include triggering a defender, transmitting a plea for assistance, triggering a UAV, signaling an individual's location or disabling a firearm. Prior examples of a receiver may be an FM radio, car unlock receiver, wireless mouse receiver, TV infrared remote control receiver, etc. Receiving devices are typically made up of a receiving radio & antenna, a processor, an energy storage device, some method of recharging the energy source, switches and indicator lights, in non-limiting embodiments.

A relay device includes a device, which can receive a signal and retransmit the signal received, in a non-limiting embodiment. Some non-limiting embodiments of relay devices include, a relay device disguised as jewelry, a watch, a pen or a belt buckle, an earbud, a defender, a mother device or even a cell phone. In a non-limiting embodiment, such a relay device may receive a signal from a sensor, including an intraoral device; amplify and retransmit said signal to another device, such as a defender or a UAV; to a remote monitoring center, such as ADT or a 911 center; or to another remote location. The signals sent and received may, or may not, be different frequencies and/or different protocols. A relay device is often required to boost the signal strength and range of a small low power signaling device. Relay devices are also often required to receive one sort of signal and transmit another. Non-limiting examples include receiving an RFID signal and retransmitting that via RF or a cellular network or receiving an electrical signal from a sensor and retransmitting that via RF or a cellular network. Prior examples of a relay device include a cell phone receiving communication from a Bluetooth headset with limited range and retransmitting it on a cellular network, a wireless LAN extender device utilized to extend the functional range of a wireless LAN access point, or an infrared blaster that takes an RF signal from an RF remote and converts that into infrared to control specific entertainment devices. Relay devices are typically made up of a receiving radio & antenna, a transmitting radio and antenna, a processor, an energy storage device, some method of recharging the energy source, switches and indicator lights, in non-limiting embodiments.

In an embodiment, the relay device 116 may be a component of the intra oral device 112 and/or the sensor 114 components of the portable signaling unit 110. In another embodiment, the relay device 116 may be separate from the intraoral device 112 or sensor 114, but may be a component of the portable signaling unit 110. In still a further embodiment, the relay device 116 may be separate from the portable signaling unit 110, but still associated with the user, and in this embodiment, the relay device 116 may include a transceiver 120 and may be configured to receive the signal generated by the sensor 114 of the portable signaling unit 110 and transmit the signal to the receiver 118. In a further non-limiting embodiment, the relay device 116 may extend the range of the signal being transmitted from the portable signaling unit 110. Therefore the relay device 116 may be a component of the portable signaling unit 110, or alternatively, may be in association with the portable signaling unit 110, disposed on or near the user. For example, the relay device 116 may be in wired communication or wireless communication with the portable signaling unit 110 in a non-limiting embodiment. In a non-limiting example, the relay device 116 may be disposed over the ear of the user, and may be in wireless communication with the intraoral portable signaling unit 110. In a non-limiting embodiment, an extra-aural device includes the transceiver 120. Extra aural devices can be placed over the ear or behind the ear, in non-limiting examples.

The system 100 may further include a power source 122. The power source 122 may be associated with the receiver 118, and may be used to power the portable signaling unit 110. This may occur in instances, for example, when the relay device 116 of the portable signaling unit 110 includes a passive RFID tag. In other non-limiting embodiments, the portable signaling unit 110 may include an active RFID tag, which may be powered by an onboard power source.

Passive and active RFID embodiments are described herein in reference to the system embodiments described. In regard to passive RFID, an external device (or in some examples a mother device as described in more detail below) may constantly ping the passive RFID for a response; however, if the portable signaling unit is deformed or activated by other means (such as contact with a sensor by the users tongue, in a non-limiting example, or manipulation of a responsive member in another example as described herein), the RFID signal would then be blocked, and the mother device or external device sending the pings to the passive RFID will not receive a response, thereby triggering an event, such as a distress signal, etc., in a non-limiting example. In the examples described herein, wherein RFID is used, passive and active RFID may be used interchangeably.

In a non-limiting embodiment, power may be provided to the system or device embodiments described herein by way of a piezoelectric member 130. The piezoelectric member 130 may be associated with the power source 122 of the system 100, or may be associated and used to power the portable signaling unit 110 and its components directly. The member 130 may be configured to develop an electrostatic potential upon deformation thereof 130, wherein the electrostatic potential provides an electric charge to the power source 122, for example. Deformation of the member 130 may be accomplished by a muscular movement of the user. For example, the piezoelectric member may be placed at or near a large muscle of the user, and by way of movement of the muscle, the member may be deformed to create the electrostatic potential required to electrically charge the power source 122, in a non-limiting embodiment. In another non-limiting embodiment, the piezoelectric member 130 may be placed under the foot of a user, and during compression and deformation of the member as the user maintains a walking movement, the power source 122 may be charged.

In a further non-limiting embodiment, the system 100 may include a processor 124 which may receive signals from the receiver 118, wherein the processor 124 may identify a location of the portable signaling unit 110 based on the signals received. The processor may be connected to the receiver by wired or wireless connection in non-limiting embodiments to provide for the transfer of information to and/or from the receiver, for example. Non-limiting examples of processors are the GPS system, cellular telephone Automatic Location Identification (ALI) system and triangulation devices housed on campuses or in monitoring centers.

In some non-limiting embodiments provided herein, the relay device, receiver, and processor may consist entirely of special-purpose electronic, optical or acoustic devices, or can utilize existing communications, computer, or surveillance infrastructure known to those skilled in the art.

In an alternative embodiment, a compressive force may not be required to activate the sensor. Where the sensor includes, for example, a contact sensor, a signal may be sent via the device by contact with the sensor. Therefore, in a non-limiting embodiment, an intra-oral device may be placed in the oral cavity (for example, in the retro-molar space or on the retro-molar pad (RMP) of a user), wherein the device may include a sensor, which may be activated or inactivated by contact. In one non-limiting embodiment, contact with a tongue, for example, of a user may send a signal via the device. The intra-oral device may be removably affixed or permanently affixed intraorally. The intra-oral device may be affixable via a retainer-type device or may be permanently affixed to a component of the intra oral portion of the user, such as externally affixed to a tooth, or embedded in a molar, in non-limiting examples. In one non-limiting embodiment, the intra-oral device may be affixed in the oral cavity by contact with the retro-molar pad (RMP), or by affixing onto one or more of the teeth of the user via an attachment component as shown, for example in FIG. 6. The device may include one or more sensors, which may include a contact sensor, such that they may be activated by contact with the tongue or any other such contact known to those skilled in the art. Other contact may include contact with a user's finger, contact with another tooth portion so as to activate the device to initiate a signal, in non-limiting examples.

In some, non-limiting embodiments, the system 100 may include one or more unmanned aerial vehicles (UAV's) 126 configured to receive signals from the system 100 and/or transmit signals to the system 100. These UAV's 126 may include lethal or non-lethal capabilities to disarm or subdue an assailant, for example.

The UAV's 126 may further include a feedback mechanism or signal which may be released there from when the UAV is activated, in an embodiment. This feedback may be in the form of audio, visual, tactile, gustatory, or olfactory feedback. In one non-limiting example, the UAV 126 may be activated to deliver a noxious gas there from. In another non-limiting example, the UAV 126 may deliver an audible feedback at a level so as to cause discomfort or harm. In still another non-limiting example, the UAV 126 may deliver an audible feedback to provide an alert, or to signal a location of a user of the system. In another non-limiting embodiment, the UAV 126 may be active to deliver a smoke screen to allow an individual sufficient time to escape the area and evade capture. In further non-limiting embodiments, the UAV 126 may include an audio or video recording capability which can be activated to record audio or video in the general vicinity of the UAV 126. In another non-limiting embodiment, the UAV 126 may be able to record digital images and may be able to transmit these images or recordings to a remote location or server, and/or save these recordings and images onboard.

The UAV 126 embodiments described herein may include at least one image acquisition device 128 for acquiring images of a target. In some instances, activation of the UAV 126 may be in response to a signal received from components of the system embodiments described herein, and in a particular non-limiting embodiment, from the portable signaling unit 110 of the system 100. Upon activation of the UAV 126 following receipt of an activation signal, the UAV 126 may navigate to the target UAV position at or near the position of the portable signaling unit 110 as described in embodiments herein. The UAV 126 may be used, in such instances, to record activity at these points of location via the image acquisition device 128.

Figure 2:
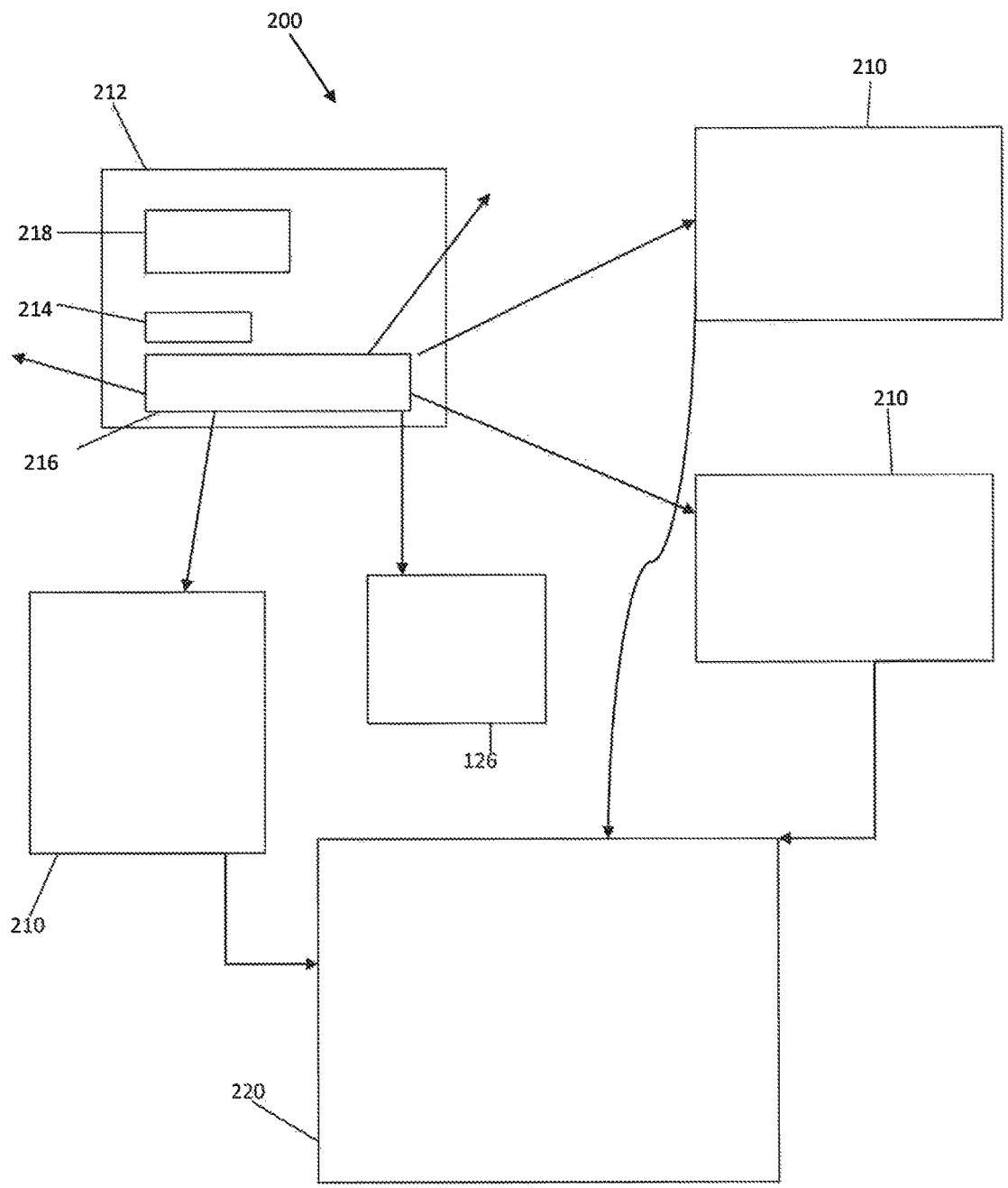
FIG. 2 is a block diagram of another system embodiment provided herein.

Identification, location, or tracking of a user of the system embodiments described herein may include determining the location of the portable signaling unit via RFID or wireless tag, or cell phone, (i.e., unit to be located) in non-limiting embodiments herein, by measuring the angles to the unit to be located from identified known points marked by the readers described in non-limiting embodiments herein, or a fixed baseline. By referencing the radio frequency signals, for example, the distance and location from the unknown point (unit to be located) can be estimated by identifying three to four or more known points. The known points can be where the antennas for the cell phone operator is mounted, in a non-limiting example wherein the unit to be located includes a cell phone (as provided in FIG. 4). In other non-limiting embodiments, as shown in FIG. 2, the known points can be where the RFID readers 210 are located, for example, in a predetermined area of a college campus, or state park, wherein a portable signaling unit 212 to be located includes an RFID tag 214 and a sensor 218. In one non-limiting embodiment, the portable signaling unit 212 may include or be associated with a relay device 216, which may be embodied as a transmitter or a transceiver in non-limiting embodiments, and may be used to extend the range of the signal generated by the portable signaling unit 212.

In one embodiment, in locating the portable signaling unit 212, the first known point may identify the distance to the RFID tag 214. The second known point then narrows down the location to two points. The third known point is then used to identify the exact location of the RFID tag 214. The process includes narrowing the exact location of the RFID tag 214 by eliminating the large area of a location to pinpoint location of the tag 214 by using three filters or three known points, in one embodiment. Two direction lines define a point area and the third line defines the exact location, in a non-limiting embodiment.

The portable signaling unit 212 may emit radio frequency signals. Readers 210 are configured to detect emitted signals from the portable signaling unit 212. In one non-limiting embodiment, the reader 210 may include an RFID reader, configured to detect radio frequency signals emitted from the portable signaling unit 212. In another non-limiting embodiment, the RFID reader 210 may energize the RFID tag 214 in the portable signaling unit 212.

The system may include a processor 220 that is enabled to receive transmissions from the readers 210. The processor 220 uses the received transmissions to triangulate a location of the portable signaling unit 212. In another embodiment, the processor may use the received transmissions to trilaterate the location, which may provide a relative or absolute location. In other non-limiting embodiments, the processor may use a combination of triangulation or trilateration to estimate or identify the location. Known to those skilled in the art, triangulation is using a series or network of triangles in order to determine the distance and/or relative position of points scattered in a region. In one example, it includes measuring the length of one side of each triangle and deducing its angles and the length of the other two sides by observation from this baseline. It is a process of determining the location of a point by forming triangles to it from known points.

Trilateration, as known to those skilled in the art, includes using the geometry of circles, spheres or triangles to determine absolute or relative locations of points by measuring distances, for example.

Figure 3:
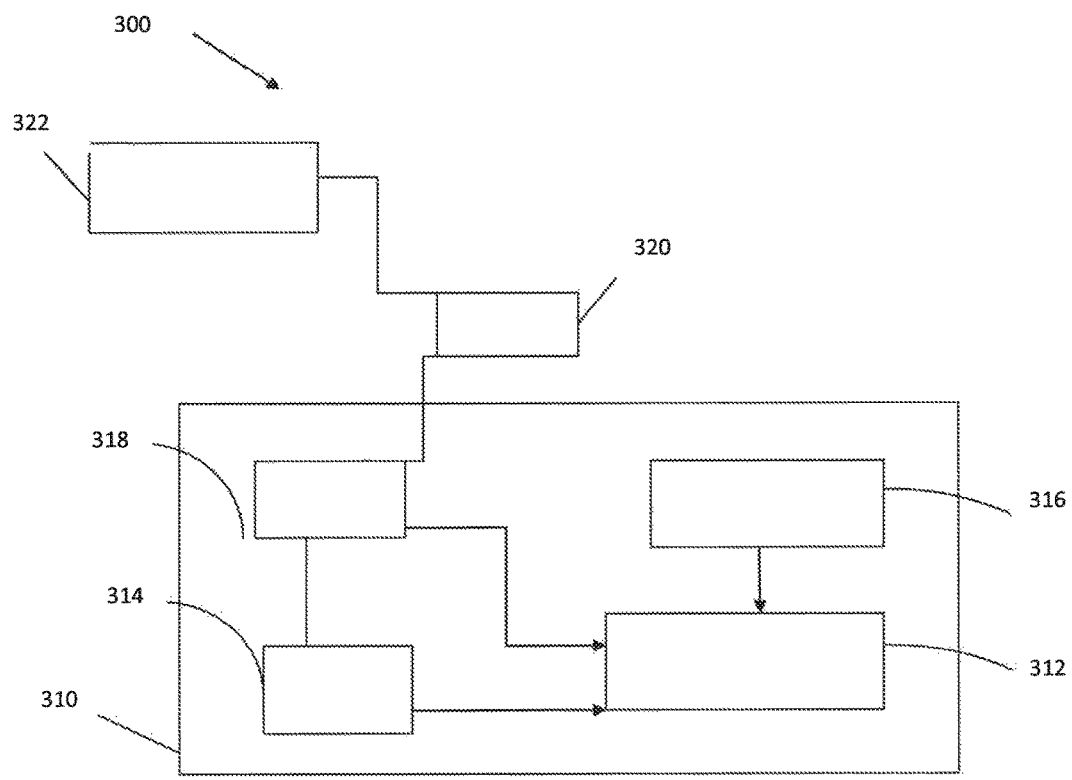
FIG. 3 is a block diagram of a further system embodiment provided herein.

In a further embodiment, shown in FIG. 3, a system 300 may include a portable signaling unit 310 having a microcontroller 312, a sensor 314, a power source 316 and a GPS receiver 318 may be operably connected to the microcontroller 312 for determining the location of the portable signaling unit 310 using a GPS system 322. The GPS receiver 318 may be operably connected to a GPS antenna 320 for receiving signals from the GPS system 322 and may provide information for determining the location of the portable signaling unit 310. The construction and function of the GPS receiver 318 and related hardware and software are well known in the art, and are therefore not described in greater detail herein.

While the portable signaling unit in one non-limiting embodiment utilizes the GPS receiver and the GPS system, the term "GPS system" as used herein includes alternative systems such as a cellular telephone Automatic Location Identification (ALI) system, as well as LORAN-C and GLONASS systems, and other alternative systems known in the art or developed in the future.

Figure 4:
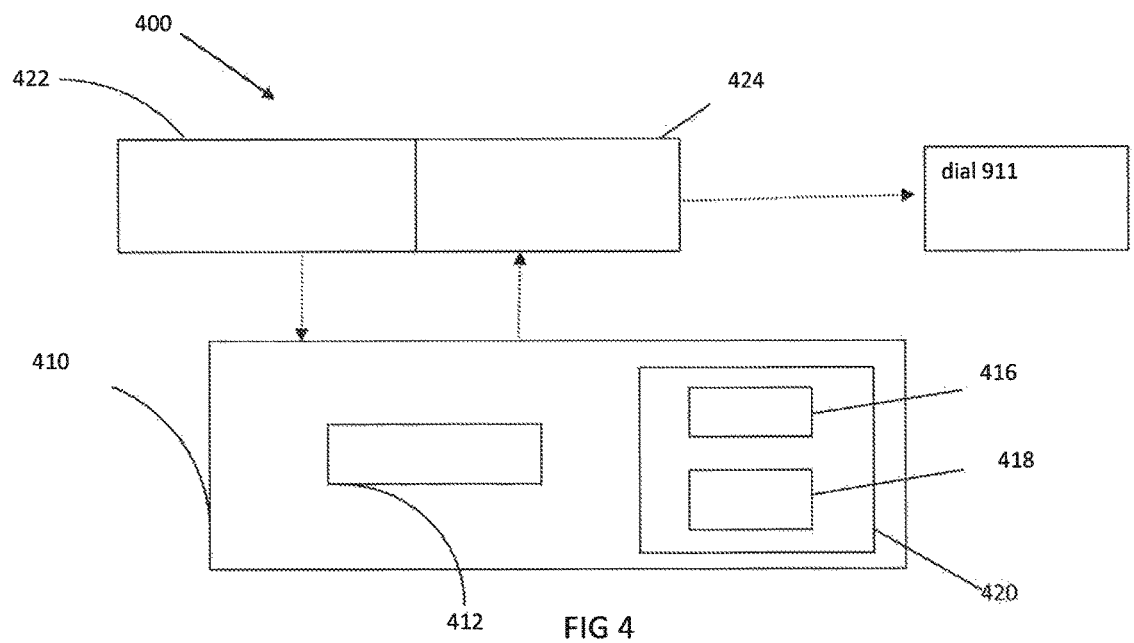
FIG. 4 is a block diagram of still a further system embodiment provided herein.

In yet a further non-limiting system embodiment 400 provided in FIG. 4, the portable signaling unit 410 having a sensor 412 for receiving a compressive force from a user, may also include a cellular transmitter 416, a cellular receiver 418, or a combination cellular transceiver 420 operably connected to a cell telephone 422, and in some non-limiting embodiments, configured to function via a cell phone application 424. The portable signaling unit 410 may therefore be activated wherein the sensor 412 may detect a compressive force and transmit a signal to the cell phone 422 and/or cell phone application 424, to affect a response. In other non-limiting embodiments, the device and/or system embodiments described herein may be activated via a sensor (i.e., an electromyography sensor, for example in a non-limiting embodiment) for detecting a skeletal muscle movement of a user, wherein the sensor generates a signal in response to the skeletal muscle movement detected. In one embodiment, a relay device may be configured to transmit a signal based on the signal received from the sensor, a receiver may be configured to receive the signal from the relay device and provide information about a location of the portable signaling unit based on the signal received, and, in some non-limiting embodiments, a power source may be included. The sensor may detect movement of muscles of the face and/or neck of the user, and any surrounding muscles. For example, the sensor may detect a movement of the masseteric, pterygoid and/or buccinator muscles. In other non-limiting examples, any other muscle groups at or near the head, face and/or neck region of the user that may provide voluntary or involuntary signals may be used in some embodiments as described herein.

The response may include an alert of authorities, for example, an automatic message sent to a local police department, an automatic dial to 911, a phone call or message sent to a guardian or friend or family member, or an output from the cell phone such as an audio or visual output to deter an attacker from the user, in non-limiting embodiments.

In some, non-limiting embodiments, the cellular link can be replaced by any portable device with WiFi connectivity that can send an alert through any of the many available internet services (e.g. instant messaging, e-mail, social media, etc.) or a specific Local Area Network (e.g. campus security), for example.

In some embodiments, the system may include components such as the portable signaling unit which may typically be in a hibernated state wherein the unit consumes little to no energy and requires very little power from the power source, such as a battery, for example. Therefore, no periodical changing or recharging batteries are required to power the system in the hibernating state. It consumes power from the primary battery only when activated.

In some embodiments described herein, the signal from the intra-oral sensor or electromyography sensor may be detected passively so that no permanent power source is required for the sensor and/or for the device. An external transmitted signal can either be reflected or used as a temporary power source for transmission of the current state of the sensor. The system can be used to detect the presence of an activated sensor, or conversely, to detect the absence of an unactivated sensor.

In embodiments described herein, user location may be identified using special-purpose electronic, optical, or acoustic devices, or can utilize existing geolocation information from communications, computer, or surveillance infrastructure.

With this portable signaling unit on the user who is unable to affirmatively report his or her whereabouts, the remote center and/or a search team may be able to communicate with the GPS receiver of the signaling unit externally, such as via a mobile phone module based on existing wireless communication technologies, such SMS or GPRS, on GSM or 3 G networks, in non-limiting embodiments, which also serves as a means of initial rough estimation of the portable signaling unit's location, for example. The portable signaling unit may further include a mobile phone module associated therewith, in non-limiting embodiments, (e.g. based on GSM or 3G networks), a GPS module, a radio Beacon and ultrasonic beacon.

As aforementioned, in some non-limiting embodiments, the signal from the sensor is detected passively so that no power source is required for the sensor. This may occur, for example, by way of an external transmitted signal which can either be reflected or used as a temporary power source for transmission of the current state of the sensor, or by other such methods known to those skilled in the art. The system can be used to detect the presence of an activated sensor, or conversely in an embodiment, to detect the absence of an unactivated sensor, or in another non-limiting embodiment, to detect the absence of an activated sensor.

In one alternative embodiment, a portable signaling unit may be provided external to but near the mouth, such as, for example, disposed in or near the ear. The portable signaling unit may be positioned over an ear of a user, and configured to sense or identify sounds from the mouth of the user. In this non-limiting embodiment, the portable signaling unit may identify a series of clicks of the user's teeth and provide a signal in response thereto. This embodiment may be provided for locating or tracking the user. The portable signaling unit may be programmed to identify a particular profile of clicks by the user to register a signal, in one embodiment. The profile of clicks may be predetermined or may be set by the user of the unit.

Embodiments described herein also include devices, systems and methods for controlling access to activation of instrumentalities, for example, to allow such access for only authorized users. More specifically, embodiments provided herein may include a system providing rapid, easy and automatic access of a user to an instrumentality to activate and use such instrumentality, such as a firearm in a non-limiting embodiment.

Firearms may need to be accessed and used quickly and easily in certain circumstances, but safety measures must be taken to prevent access to firearms by unauthorized users. The need for quick, but authorized access may occur by allowing a user to activate a smart firearm via embodiments described herein. A non-limiting system embodiment including a portable signaling unit comprising an intra-oral element and a sensor for detecting activation from a user (in one embodiment this signal may include a compressive force from the user), wherein the sensor is configured to generate a signal in response to the activation (i.e., compressive force) detected may be used to activate or deactivate a smart firearm, wherein the smart firearm is reactive to the portable signaling unit. A smart firearm includes one in which a component of the firearm is configured to recognize a signal or information from another device or component as described in greater detail herein, which may be required for authenticating a user of the smart firearm and activation and/or deactivating the smart firearm, in a non-limiting embodiment. The non-limiting system embodiment may include a relay device configured to transmit a signal from the portable signaling unit. The firearm may include a receiver configured to detect the signal from the relay device, and activate or deactivate the firearm in response to the signal received, for example. The signal received by the firearm from the portable signaling unit may provide authorization required for activation or deactivation of the firearm.

Various embodiments described herein may include a feedback component, configured to provide sensory feedback to a user or another in response to activation, so as to provide an alert in some non-limiting embodiments. For example, after sensing a pressure, the sensor may signal a feedback component to deliver an auditory output, in a non-limiting embodiment, to provide an alert regarding an emergency situation. Alternatively, or in addition, the auditory output may be provided to deter an attacker from attacking the user.

Figure 5:
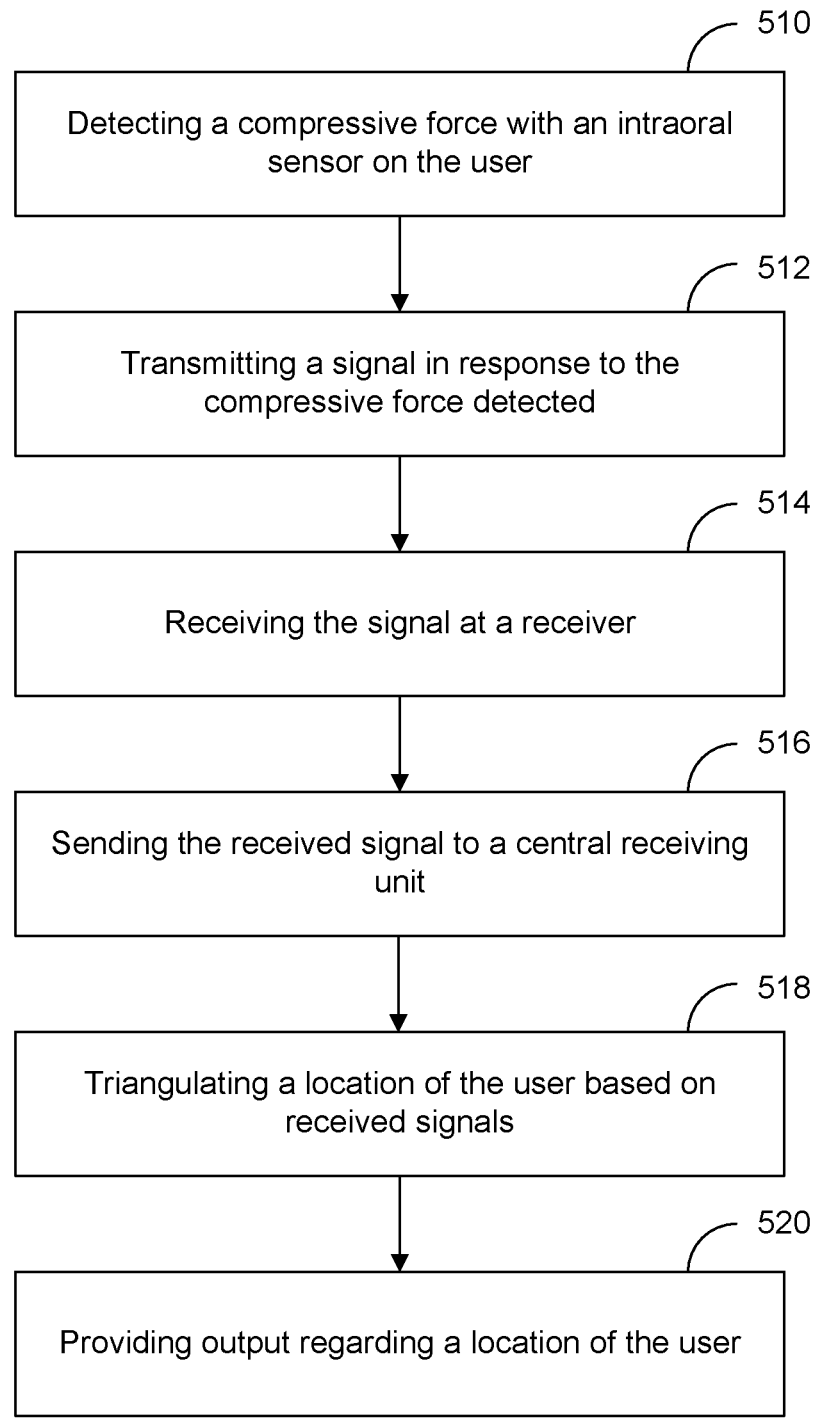
FIG. 5 is a flow chart of a method embodiment provided herein.

In a further embodiment, provided in the flowchart of FIG. 5, a method for locating a user 500 is provided, the method includes detecting 510 a compressive force with an intraoral sensor on the user, 512 transmitting a signal in response to the compressive force detected, receiving 514 the signal at a receiver, sending the received signal to a central receiving unit 516, and triangulating a location of the user 518 based on received signals, and providing 520 output regarding a location of the user.

Figure 6:
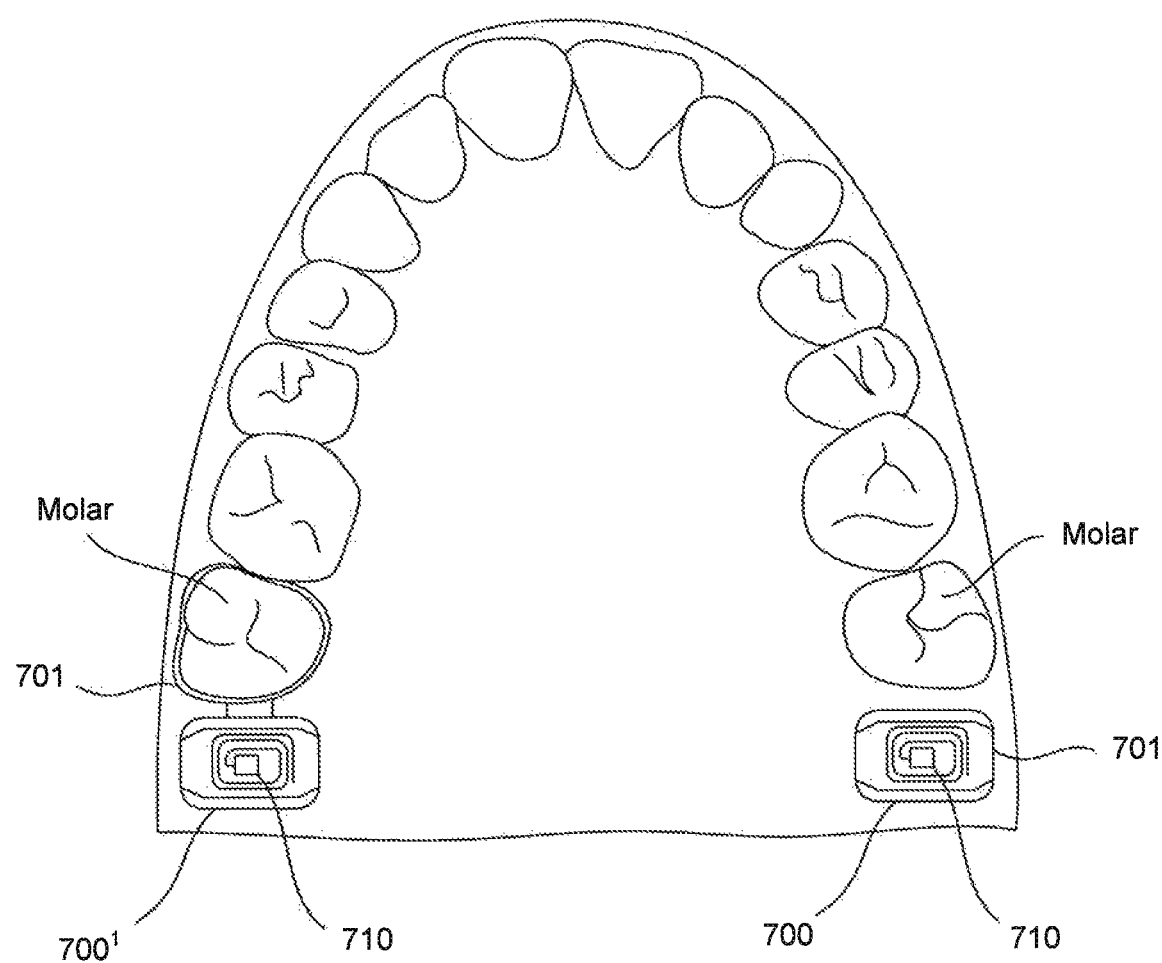
FIG. 6 is a diagram including an embodiment of an intra-oral portable signaling device as described herein.

FIG. 6 is a diagram including an embodiment of an intra-oral portable signaling unit—a retro molar pad (RMP) 700 shown as displayed in the mouth of a user located behind the last molar. The RMP 700 may wrap around the retro molar pad of the user as shown in FIG. 6, or an RMP 700' may be removably or permanently affixed to one or more teeth of the user as shown in FIG. 6. The RMP 700' may include an attachment component 701 that may interact with one or more teeth of a user to retain the RMP 700' in the mouth of the user. The RMP 700, 700' includes a responsive member 710 reactive to user input (i.e., sensor, switch) to initiate the RMP 700, 700'. Activation of this responsive member may initiate a signal to a communicative "mother" device, which may also be worn by the user, or initiate a signal to a third party, for example, to a police station, campus security, a health professional, a family member or other.

Figure 7:
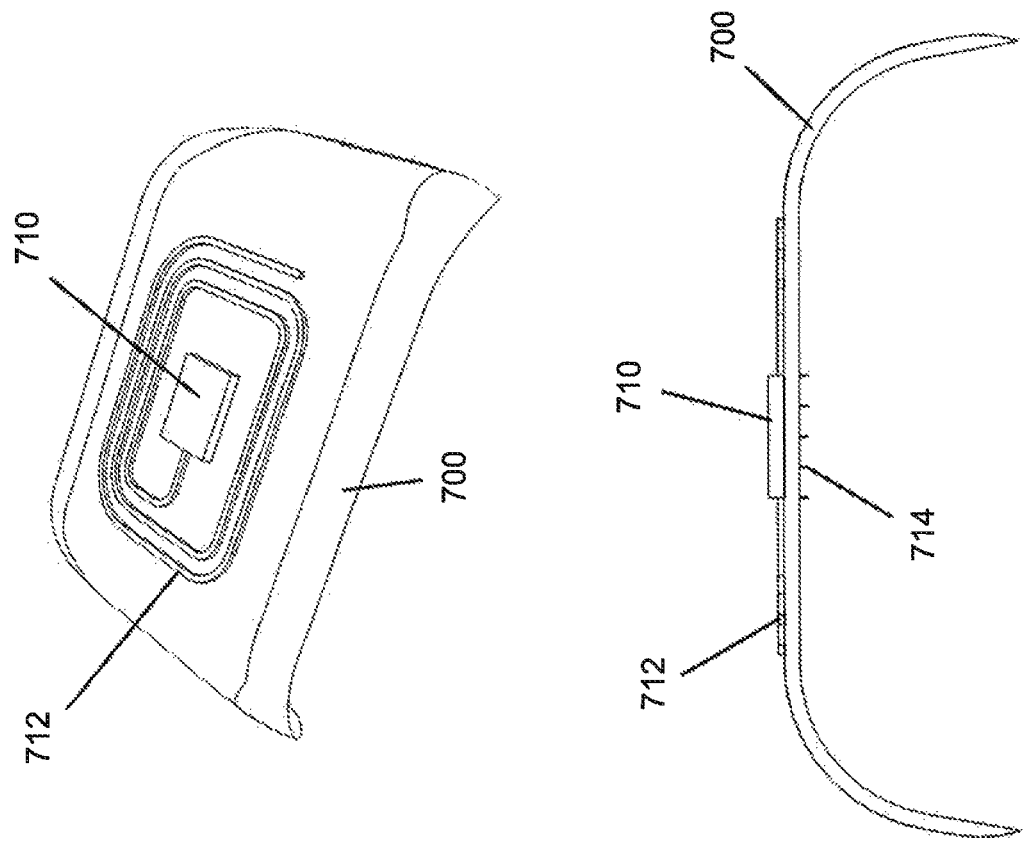
FIG. 7A is a top perspective view of another portable signaling unit.
FIG. 7B is a side perspective view of another portable signaling unit.

FIG. 7A is a top perspective view of another portable signaling unit, in a non-limiting embodiment, of a retromolar pad embodiment 700 including a power source (not shown), a sensor or a switch 710 for receiving input from a user, and circuitry 712. The retromolar pad 700 may further include a relay device (not shown) to provide a signal to a communicative device, or a third party device, in some non-limiting embodiments, as described herein. FIG. 7B is a bottom side perspective view of the retromolar pad embodiment 700 shown in FIG. 7A, wherein a number of projections 714 are shown as extending from the bottom side of the retromolar pad 700. In this non-limiting embodiment, the projections 714 may be used to obtain a biological sample from a user. The biological sample obtained may include saliva or tissue for example. The sample may be used to identify the user by way of the circuitry 712 as described in more detail herein, through nanopore technology or lab-on-a-chip technology known to those skilled in the art.

Figure 8:
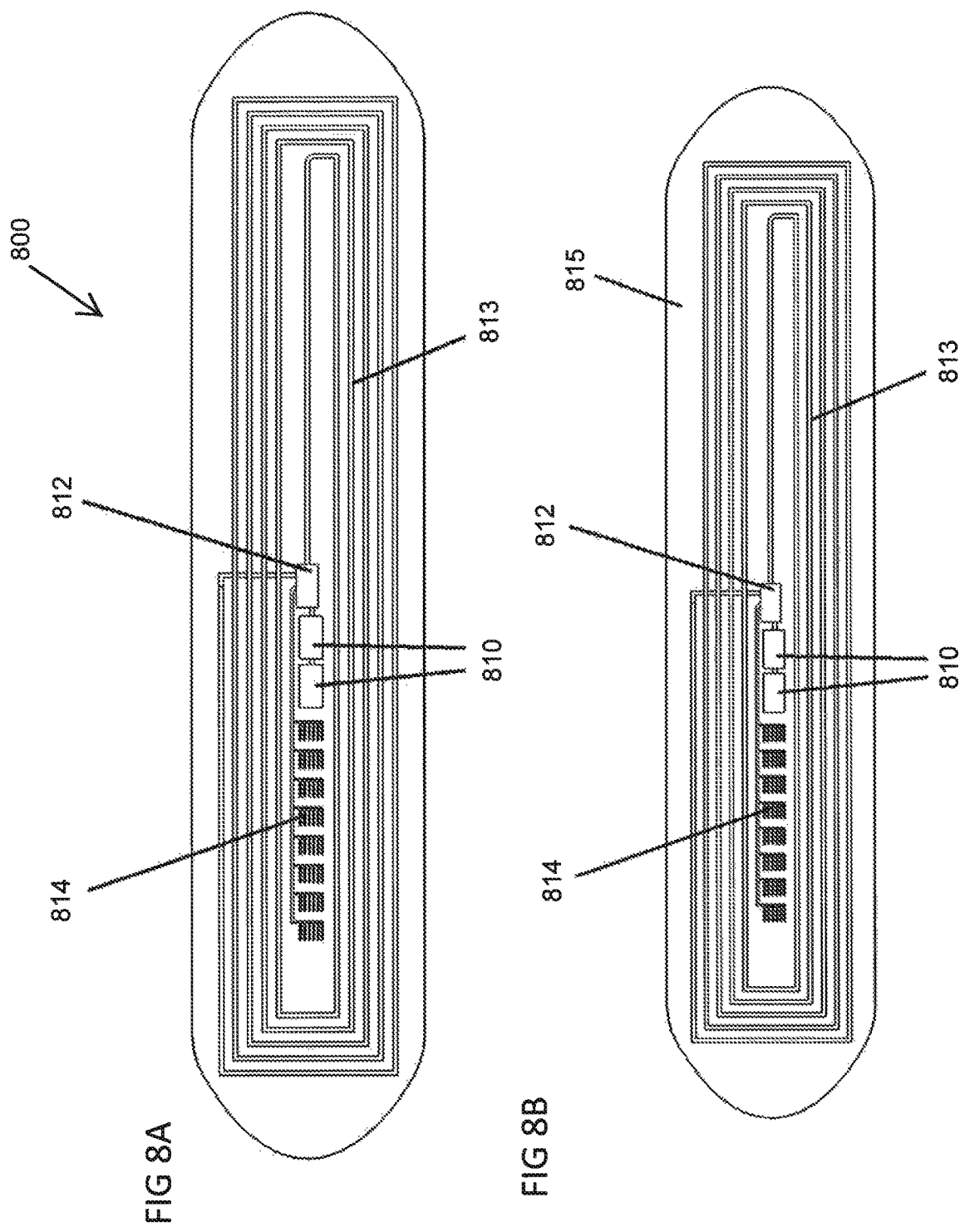
FIGS. 8A-8B include cross-sectional views of another embodiment of a portable signaling unit.

FIGS. 8A-8B include cross-sectional views of another embodiment of a portable signaling unit, an intra-oral palate device 800, wherein the device includes a responsive member (i.e., a sensor, a switch, etc.) 812 for receiving user input, and is configured to generate a signal in response to the input received, an antenna 813 or a relay device or other wireless component for transmitting the signal, an energy storage component 814 for storing energy to power the unit or a battery 814, and in some non-limiting embodiments, the intra oral palate device 800 may optionally include a nanopore and a lab on a chip 810 as shown herein.

Figure 9:
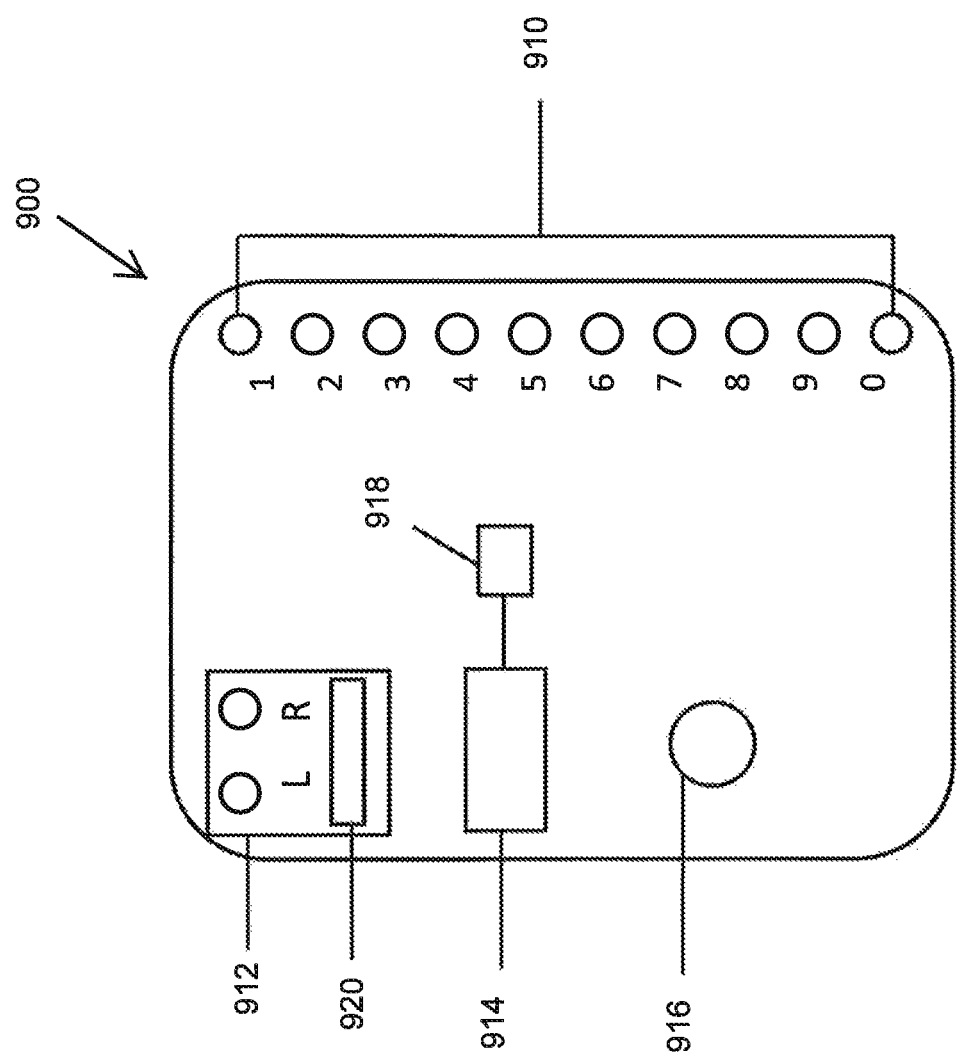
FIG. 9 is an illustrative diagram of a non-limiting embodiment of a communicative device ("mother device")

FIG. 9 is an illustrative diagram of a non-limiting embodiment of a communicative device ("mother device") 900. The mother device 900 may include a receiver 918 configured to receive a signal from the relay device, wherein the relay device is a component of the portable signaling unit, in one non-limiting embodiment. The mother device may further include a processor 914 enabled to receive a signal from the receiver 918. In the embodiment shown in FIG. 9, ten responsive members 910 are provided to receive input from a user by way of a passcode. The mother device 900 may request input of any number of digits to unlock and/or activate the mother device. This passcode may be used as an alternative to, or in conjunction with a biometric data receiver 912 indicated as L and R, wherein the mother device 900 may request the fingerprint on the fingerprint pad 920 from any one or any combination of the fingers of the user to access the mother device 900. These authentication processes may be combined or may be used independently of one another to provide guarded access to the system embodiments described herein. The password and biometric data of the user may be pre-stored on the mother device 900 or elsewhere and communicated to the mother device 900, and may be compared by the mother device 900 or an external device with the passcode and/or biometric data provided by a user attempting to gain access to the system. The combination of passcode and biometric data provides higher security for authentication of the user of the system. The communicative ("mother") device 900 may further include a speaker 916 in a non-limiting embodiment. The mother device 900 may include wired or wireless connectivity to provide identification verification of the user of the system. The mother device 900 also may include wired or wireless connectivity to re-transmit distress signals or to be used with a mobile application as described in FIGS. 21, 22, for example.

Figure 10:
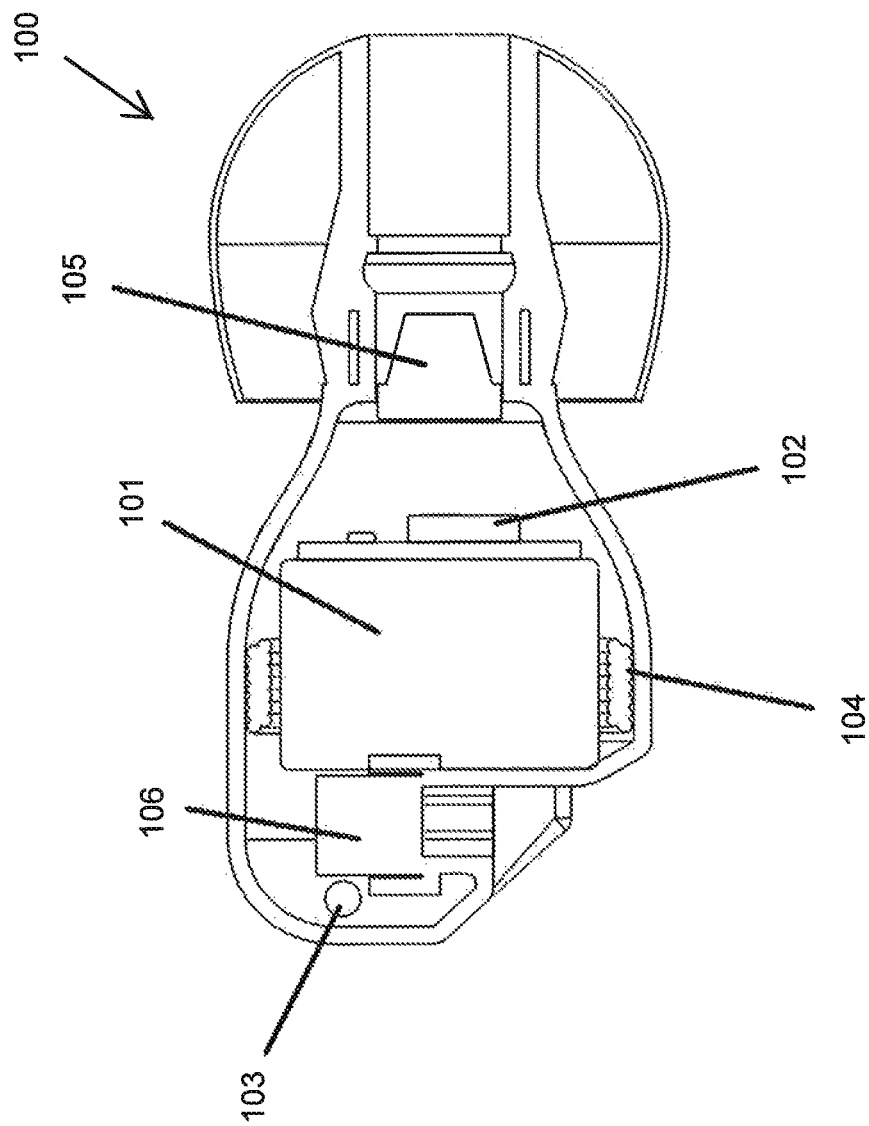
FIG. 10 is a cross sectional view of an embodiment of an earbud.

FIG. 10 is a cross sectional view of an embodiment of an earbud 100 as described herein. The earbud 100 may include a power source or energy storage component 101, in a non-limiting example the power source may be a battery, a charging coil 104 for charging the power source 101, a speaker driver 105 for producing sound to a user, and a microphone 106, as well as a radio antenna 103 or other communications device for providing wireless or wired communications to and/or from the earbud embodiment 100. The earbud 100 may further include a controller 102.

Figure 11:
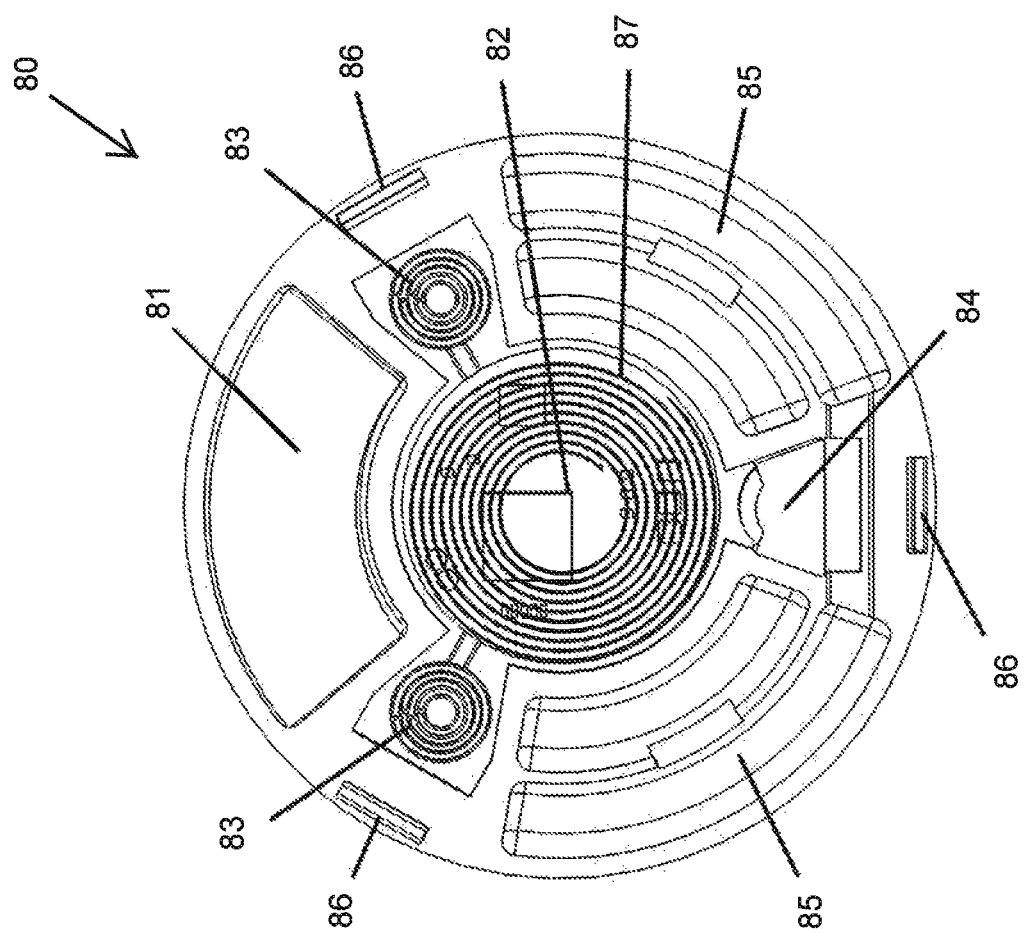
FIG. 11 is a cross sectional view of a chip defender device embodiment.

FIG. 11 is a cross sectional view of a chip defender device embodiment 80. The chip defender device embodiment 80 may work in conjunction with the portable signaling device 700, 800, the jewelry device, or with the mother device 900, as described herein. The chip defender device 80 may include a gas cartridge or containment component 85 for housing a gas under pressure, in one non-limiting embodiment, and a valve assembly 84 for releasing or dispersing the gas from the cartridge 85. As aforementioned, the chip defender 80 may additionally or alternatively emit a chemical, such as tear gas or an emetic, or smoke, in a non-limiting embodiment, that would deter a potential attacker. The defender 80 may further include a gas outlet 86 wherein which the gas or other chemical is emitted therefrom, a power source or energy storage component such as a battery 81 in a non-limiting embodiment, a radio/controller 82, and an antenna 83 or other wireless communications component for communicating signals to and/or from the chip defender 80. In another non-limiting embodiment, the chip defender 80 may include a speaker for exerting an excruciating sound to a would-be attacker to act as a deterrent and to signal for help. The chip defender 80 further includes a wireless charge coil 87 for charging the device. As with any of the defender embodiments, the chip defender device may be removably or permanently attached to a user. The defender device may include an adhesive on a portion thereof, which may be removable and replaceable in some non-limiting embodiments. The defender may be removably or permanently attached to a user by other means known to those skilled in the art.

Figure 12:
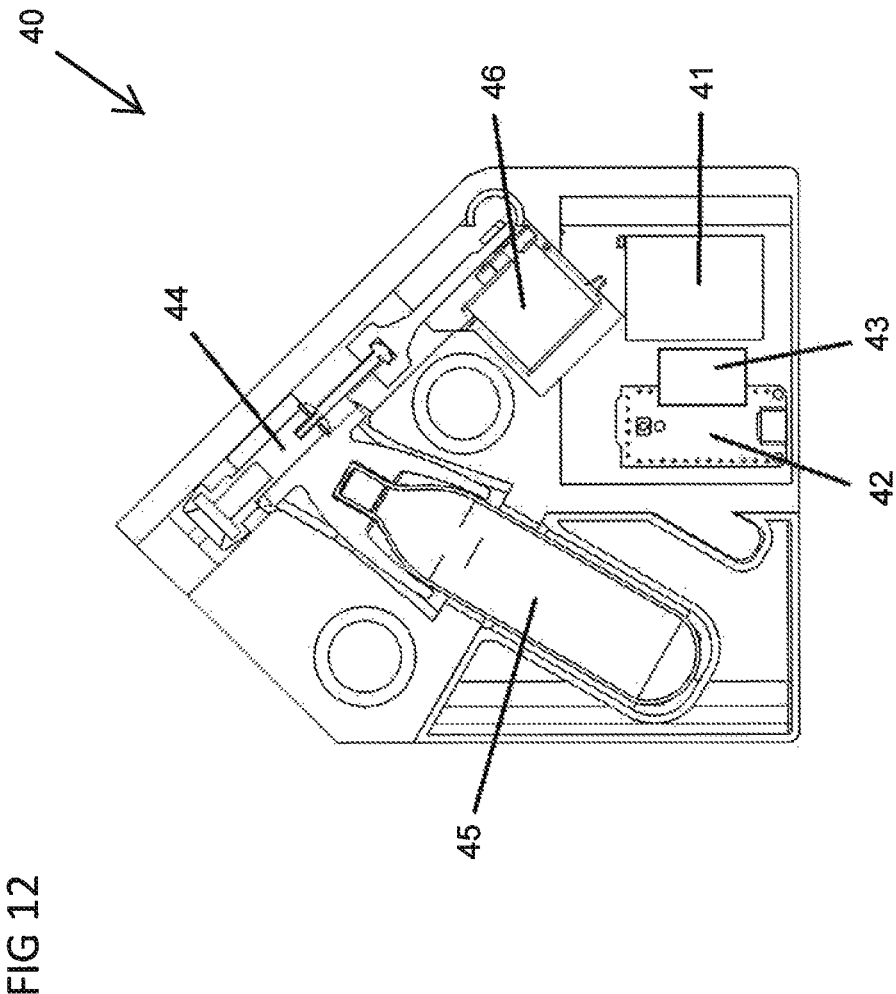
FIG. 12 includes a cross sectional view of an alternative defender embodiment.

FIG. 12 includes a cross sectional view of a defender embodiment 40. The defender 40 may include a gas cartridge 45 for housing a gas under pressure, in one non-limiting embodiment, and a valve assembly 44 for dispersing gas from the gas cartridge 45. As aforementioned, the defender 40 may additionally or alternatively emit a chemical, such as tear gas or an emetic, or smoke in a non-limiting embodiment, that would deter a potential attacker or allow time for escape. The defender 40 may further include a servo motor 46, a power source or energy storage component, such as a battery 41, in a non-limiting embodiment. The defender 40 also includes a radio 43, and a control board 42. In another non-limiting embodiment, the defender 40 may include a speaker (not shown in FIG. 12) for exerting an excruciating sound to a would-be attacker to act as a deterrent and to signal for help.

FIGS. 13A-13B include another embodiment of a defender, a mini-defender embodiment 70. The perspective view of FIG. 13A, the cross-sectional views of FIGS. 13B and 13C include a cap 77, a port 72 from which contents of the defender are dispersed, a gas cartridge 75 and a valve assembly 74 for dispersing the contents of the gas cartridge 75. The mini-defender 70 further includes a radio 73 for providing communications to and from the defender 70, a control board 72 for processing signals, and a servo motor 76. A power source or energy storage component 71 is also provided. The mini-defender may receive signals from a portable signaling device described herein. The portable signaling device may activate the defender to release a compressed gas, an emetic, smoke or a deterring sound as described in other embodiments herein when the portable signaling device is activated by the user. Alternatively, or in addition, the defender embodiments described herein may be activated independently to deter a potential attacker, in some non-limiting embodiments.

FIGS. 14A-14B include a side cross sectional view (FIG. 14A) and a perspective partial cut-away view (FIG. 14B) of the pen defender embodiment 60 of FIG. 14A. The pen defender 60 may include a working pen, useable for writing, having ink 68, a pen clip 67, and a pen tip 69. The pen defender 60 may include a gas containment component 65, a valve 64, a control board 62, a power source (i.e., battery or other power source) 61, and a charging coil 66 for charging the power source 61. The pen defender 60 may further include an antenna 63 or other wireless communications device as described herein.

Figure 15:
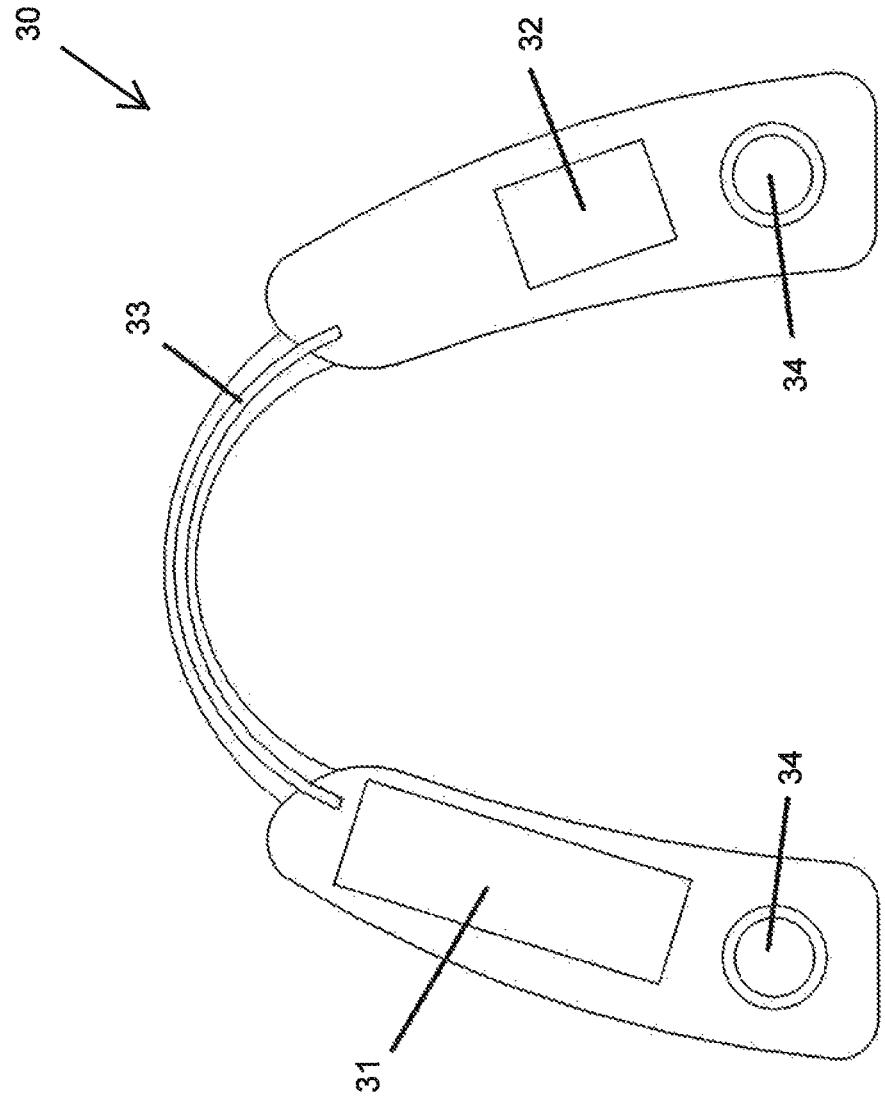
FIG. 15 includes a cross-sectional view of a mouth guard portable signaling unit.

FIG. 15 includes a cross-sectional view of a mouth guard portable signaling unit 30. The mouth guard portable signaling unit 30 can be placed over the rear molars of a user, and includes a responsive member 34 that is responsive to user input. This responsive member may include a sensor or a switch in non-limiting embodiments. It may be activated by compression of the teeth (i.e., pressure sensor, contact sensor), in non-limiting embodiments, to initiate a signal. The portable signaling unit 30 includes an energy storage component or battery 31 for providing power to the unit, a control board 32 for processing signals received and sent to and/or from the unit, and a radio antenna 33 or other wireless communications component for providing communication to and from the unit 30.

Figure 16:
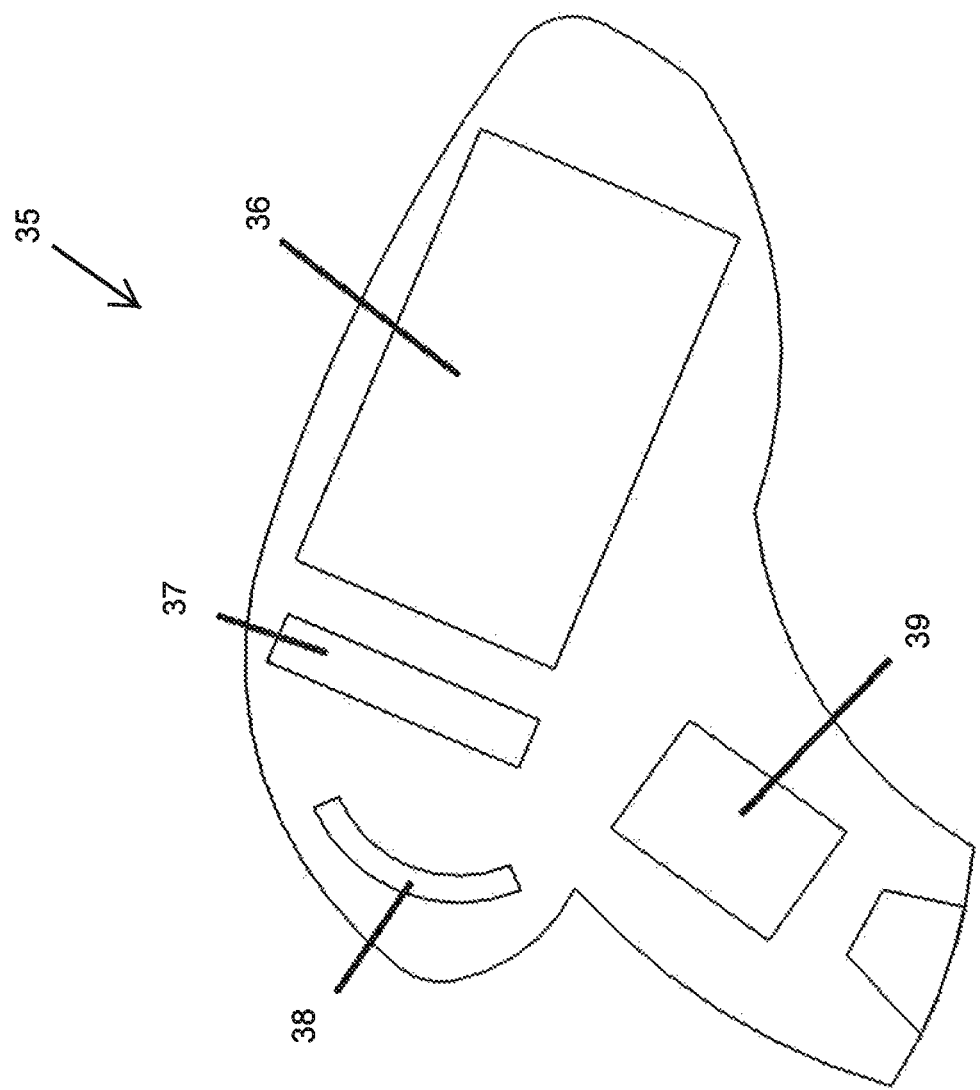
FIG. 16 is a cross sectional view of an inner ear portable signaling unit.

FIG. 16 is a cross sectional view of an inner ear portable signaling unit 35 having an energy storage component or power source 36, a control board 37, a radio antenna 38 or other wireless communications component, and a speaker driver 39 for providing sound to the user.

Figure 17:
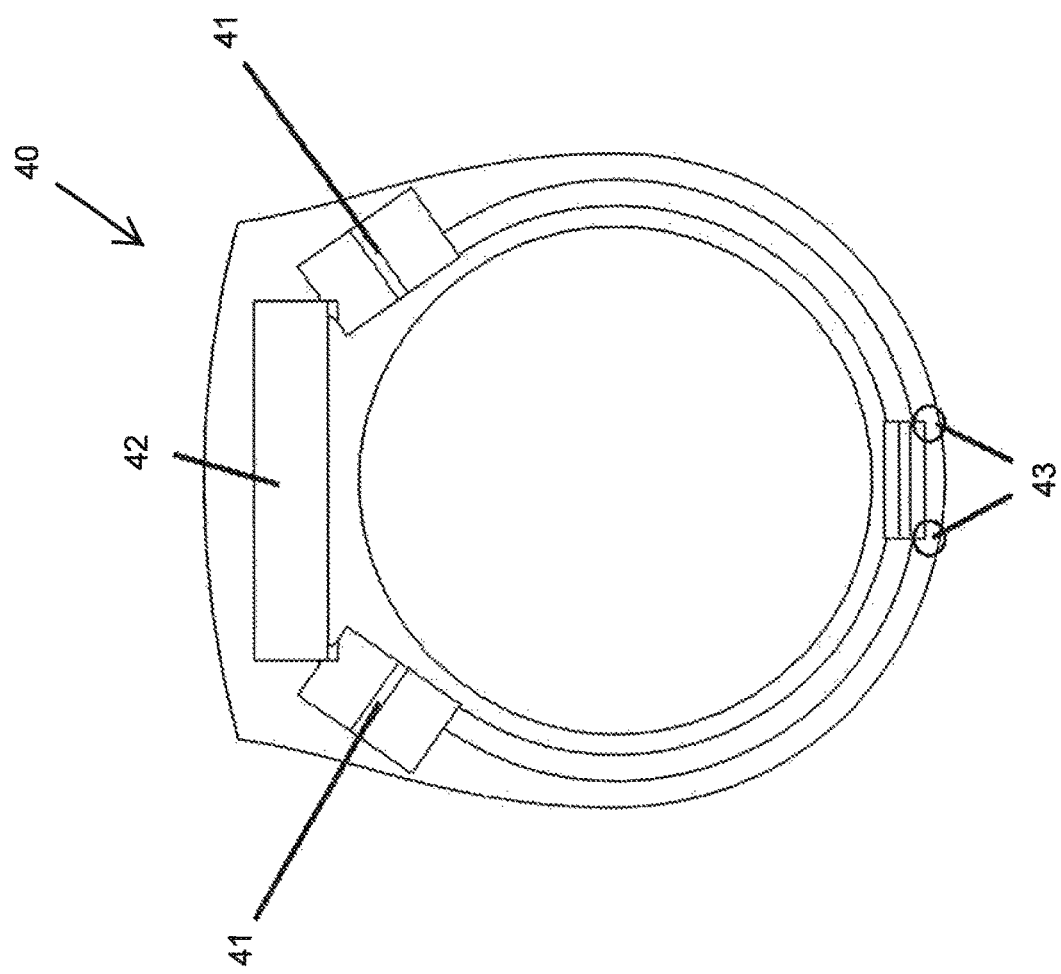
FIG. 17 includes a cross sectional view of a ring signaling unit.

FIG. 17 includes a cross sectional view of a jewelry component (i.e., a ring) signaling unit 40 having an energy storage component or power source 41, a control board 42, a radio antenna or other wireless communications component is shown by the lines connecting between 41 and 43 for example, and a responsive member (i.e., switch, sensor(s)) 43, responsive to user input.

Figure 18:
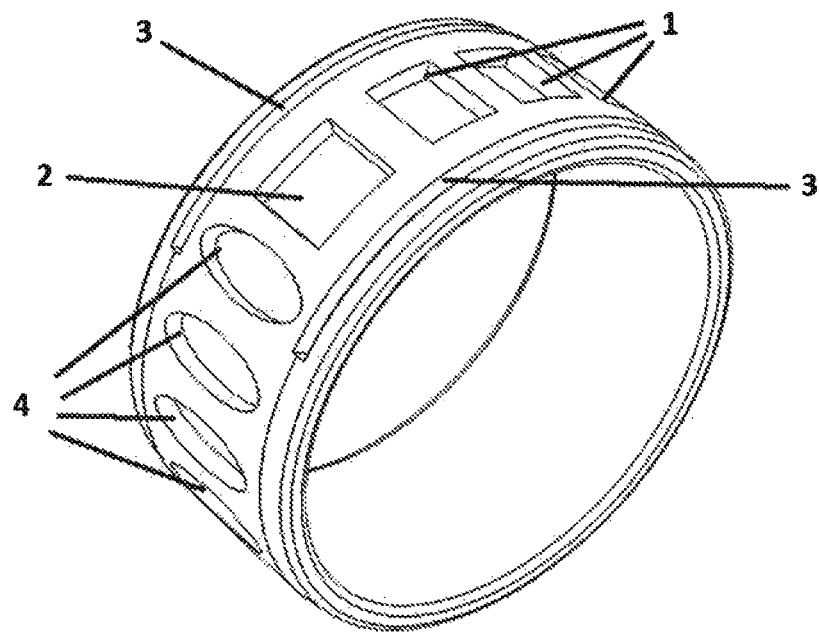
FIG. 18 is a perspective view of an embodiment of a jewelry component signaling unit.

FIG. 18 is a perspective view of another embodiment of a jewelry component signaling unit 40' having an energy storage component or power source 1', a control board 2', and a responsive member 4' reactive to user input, and a radio antenna or other wireless component 3' for transmitting signals to and/or from the signaling unit 40' as described herein. The jewelry component signaling unit 40' may be communicatively connected to the mother device 900 in a non limiting embodiment and the mother device may re-transmit the signal to a third party as described herein. In other embodiments, the portable signaling unit may transmit a signal directly to a defender or the third party without the mother device 900. In a further embodiment, the jewelry component signaling unit 40' may act as a defender for emitting a chemical, smoke, sound, or other deterrent to a potential attacker as described in other embodiments herein.

Figure 19:
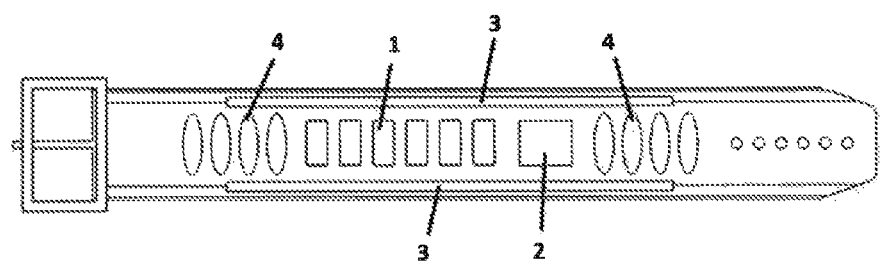
FIG. 19 is a top view of a band embodiment signaling unit and/or defender.

FIG. 19 is a top view of a band embodiment signaling unit having an energy storage component or power source 1, a control board 2, a responsive member reactive to user input 4, and a radio antenna or other wireless communications component 3 for being worn by a user. In a further embodiment, the band embodiment may act as a defender for emitting a chemical, smoke, sound, or other deterrent to a potential attacker as described in other embodiments herein. The band embodiment signaling unit is an embodiment which can be attached to or useable with a user's existing watch. The band embodiment is another form factor of a defender, in a non-limiting embodiment.

Figure 20:
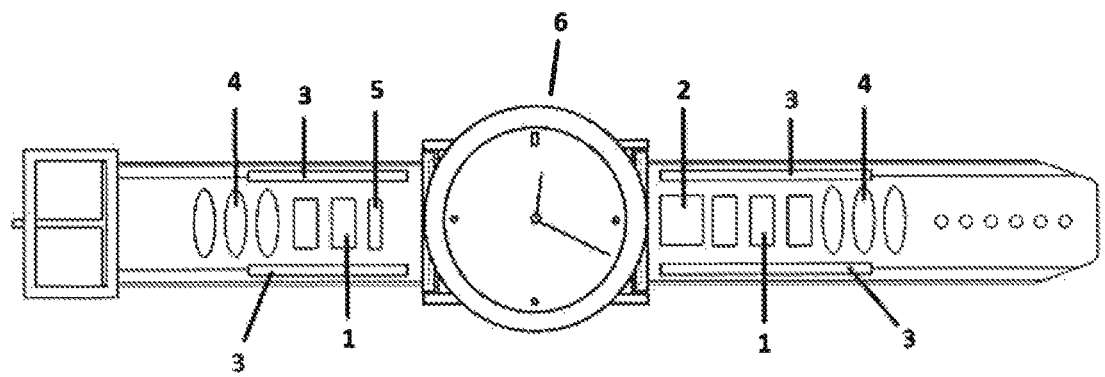
FIG. 20 is a top view of a watch embodiment signaling unit and/or defender.

FIG. 20 is a top view of a watch embodiment, which is another form factor of the signaling units shown in FIGS. 15-19. In a further embodiment, the watch embodiment may be a watch defender, and may include its own watch mechanism and an ability to emit a gas, smoke or other chemical, or a deterring sound upon activation, in order to deter a potential attacker. The watch defender embodiment may be disguised as a fitness tracker, in another non-limiting embodiment.

In still a further non-limiting embodiment, the defender may emit a thick cloud of smoke upon activation in order to hide and/or disguise the movements of an individual. The intent is to give an operative sufficient time to evade capture or escape confinement. Like the other defenders, this defender can be triggered by a portable signaling device or other means described for signaling herein.

The portable signaling units of FIGS. 15-20 may be communicatively connected to the mother device 900 in some non-limiting embodiments, wherein which signals may be transmitted to the mother device 900, and the mother device may re-transmit the signal to a third party as described herein. In other embodiments, the portable signaling unit may transmit a signal directly to a defender or the third party without the mother device 900. In a further embodiment, the jewelry component signaling unit 40 may act as a defender for emitting a chemical, smoke, sound, or other deterrent to a potential attacker as described in other embodiments herein.

Figure 21:
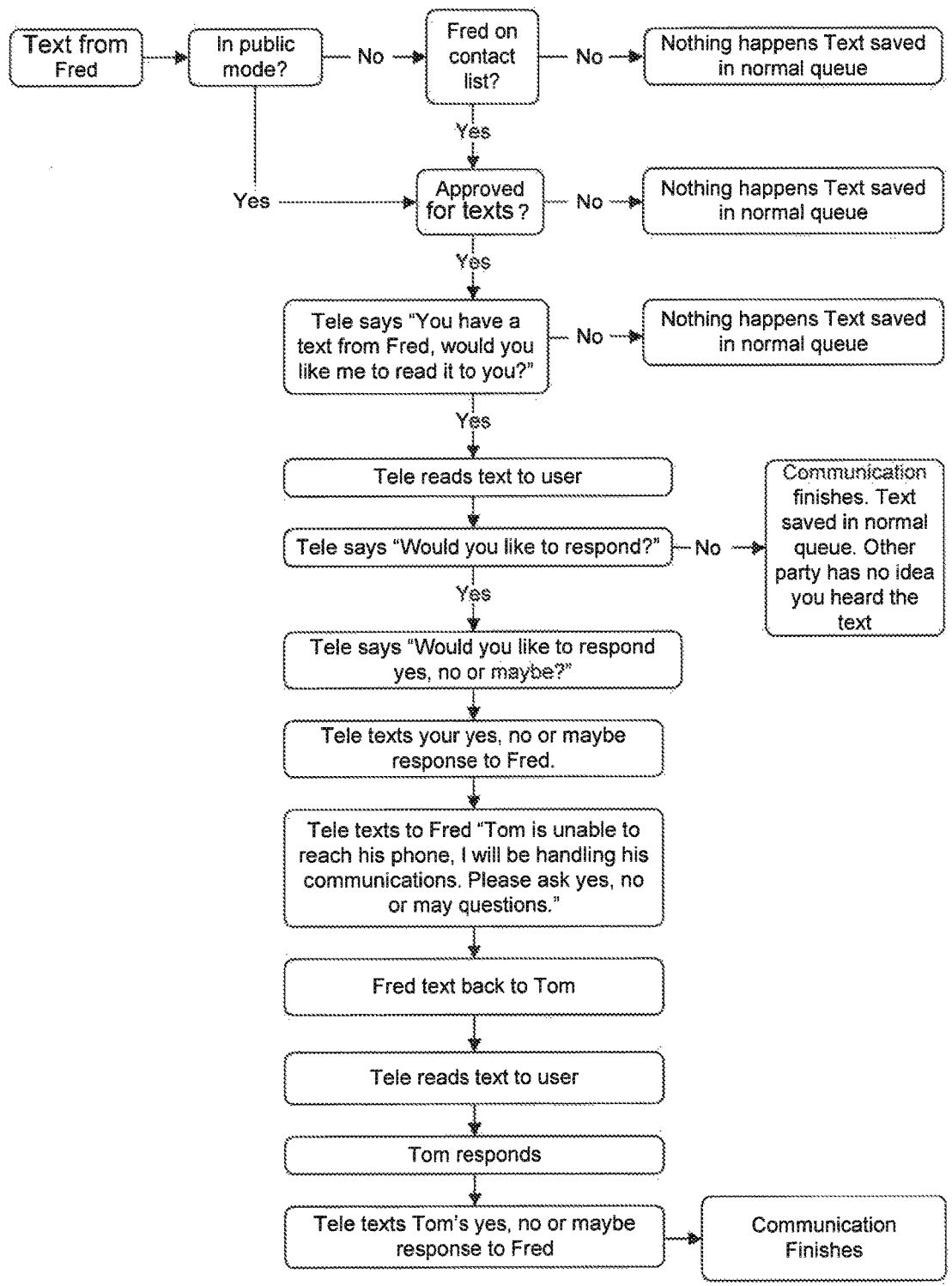
FIG. 21 is a flow chart of a non-limiting example of a system, which includes a mobile application, useable with a portable signaling unit.

FIG. 21 is a flow chart of a non-limiting example of a system, which includes an application, useable with a portable signaling unit, wherein the application operates on a cellular phone or on the communicative "mother" device. The application can be run on the cellular phone (i.e., a smartphone) or on the communicative "mother" device. Alternatively, the system may include a cellular phone and a communicative "mother" device, which are communicatively connected to one another. The flow chart of FIG. 21 provides an example of the way in which the system may operate when a user of the system receives a text message from another, wherein "tele" is the phone application. The application provides for covert communications to and from a user of the system, wherein the user can selectively receive text messages or phone calls from another via the application and provide responses to the text message or call by way of the responsive member of the portable signaling unit. In this non-limiting system embodiment, an ear bud may be used to communicate the message to the user (the wearer of the earbud) and the user may reply by way of the portable signaling unit, whether intra-oral, palate, or the jewelry signaling unit described herein. The components of the system, including, in a non-limiting embodiment, the ear-bud, the portable signaling unit, and the application (either on the cellular phone or on the mother device) may be wired or wirelessly connected to one another (communicatively connected).

Figure 22:
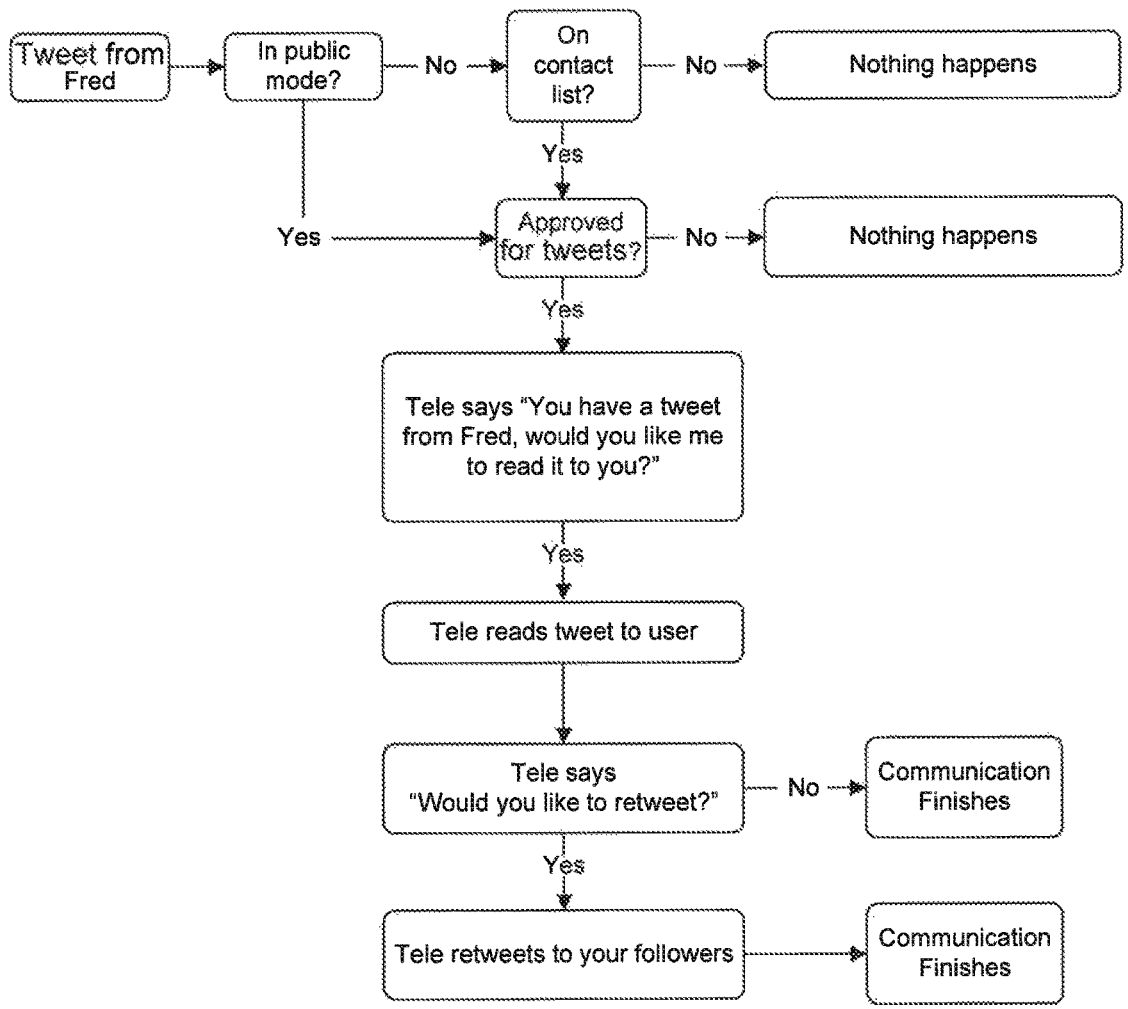
FIG. 22 is a flow chart providing another example of a non-limiting example of a system, which includes a mobile application, useable with a portable signaling unit.

FIG. 22 is a flow chart providing an example of the system described in regard to FIG. 21; however, wherein the system is used to receive and answer tweets read to a user by way of the application. The flowchart of FIG. 22 demonstrates a covert means to receive and respond to a tweet (or other social media message), in a non-limiting embodiment.

While in some non-limiting embodiments described herein, activation of the devices and systems provided herein may be described by detection of a compressive force by a user, a compressive force is not required. As aforementioned, in some non-limiting embodiments, the devices and/or systems herein may include, for example, a sensor activated by contact (i.e., a contact sensor) or activated by a change in temperature, or change in state including moisture, removal of the sensor/device or placement of the sensor/device in or on the user. Many methods of activation are possible as are described herein, and the disclosure is not intended to be limiting in regard to method of activation of the device, or methods of signaling using the device.

In some non-limiting embodiments, the system may only be functional when the portable signaling device, the communicative "mother" device and a defender are within a pre-determined proximity from one another, therefore preventing an unauthorized user from activating the portable signaling device, the mother device or a defender. In other embodiments, use of the mother device is required to activate the portable signaling device via a passcode and/or biometric data logon by the user.

In an embodiment, a system including a portable signaling unit configured to be associated with a user including a sensor and/or a responsive element for receiving user input, wherein the sensor and/or responsive element is configured to generate a signal in response to the input received is provided. The system further includes a relay device to transmit a signal from the sensor and/or responsive element, a receiver to receive the signal from the relay device; a processor enabled to receive a signal from the receiver, wherein the signal is used to: identify and provide information about a location of the portable signaling unit, activate a deterrent emitting device, retransmit a signal to a third party device, and/or communicate with a third party through a cellular phone application, and a power source.

In a further embodiment, the system may include a defender device comprising the receiver and/or the processor, wherein the defender device is configured to emit a deterrent upon receiving a signal from the receiver and/or the processor.

In still a further embodiment, the system may include a communicative device comprising the receiver and/or the processor, wherein the communicative device retransmits the signal received, activates the defender device, identifies and provides information about the location of the portable signaling unit, and/or communicates with the third party through the cellular phone application.

In another embodiment, a system including a portable signaling unit configured to be associated with a user including a sensor and/or a responsive element for receiving user input, wherein the sensor and/or responsive element is configured to generate a signal in response to the input received is provided. The system further includes a relay device to transmit a signal from the sensor and/or responsive element, a receiver to receive the signal from the relay device; wherein the signal is used to: identify and provide information about a location of the portable signaling unit, activate a deterrent emitting device, retransmit a signal to a third party device, and/or communicate with a third party through a cellular phone application, and a power source.

In a further embodiment, the system may include defender device comprising the receiver, wherein the defender device is configured to emit a deterrent upon receiving a signal from the receiver.

In still a further embodiment, the system may include a communicative device comprising the receiver, wherein the communicative device retransmits the signal received, activates the deterrent device, identifies and provides information about the location of the portable signaling unit, and/or communicates with the third party through the cellular phone application.

In yet a further embodiment, the system includes a cellular phone comprising the receiver. In still a further embodiment, the system further includes a defender device, wherein the defender device comprises the receiver and the processor, such that the signal may activate the defender to emit a chemical, gas, smoke, or sound there from.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A system comprising:
   a portable signaling unit comprising an intra-oral element and a sensor for detecting a compressive force from a user, wherein the sensor generates a signal in response to the compressive force detected;
   a relay device to transmit the signal from the sensor;
   a receiver to receive the signal from the relay device;
   a processor enabled to receive a signal from the receiver, wherein the signal is used to identify and provide information about a location of the portable signaling unit;
   a power source; and
   an unmanned aerial vehicle (UAV) to receive the signal from the relay device wherein said UAV is activated upon receipt of the signal.

2. A system comprising:
   an electromyography sensor for detecting a skeletal muscle movement of a user, wherein the sensor generates a first signal in response to the skeletal muscle movement detected;
   a relay device configured to transmit a second signal based on the first signal received from the sensor;
   a receiver configured to receive the second signal from the relay device and provide information about a location of the portable signaling unit based on the second signal received;
   a power source; and
   an unmanned aerial vehicle (UAV) configured to receive a third signal from the sending unit wherein the UAV is activated upon receipt of the signal.

3. A device comprising:
   a portable signaling unit positioned intra-orally, said portable signaling unit comprising a sensor, wherein said sensor detects a pressure received by the portable signaling unit, and generates a first signal in response there to;
   a relay device associated with the portable signaling unit, said relay device configured to transmit a second signal comprising information about a location of the portable signaling unit to a receiver; and a power source, wherein a third signal from the device is configured to activate an unmanned aerial vehicle (UAV).

4. A method for locating a user, comprising:

detecting a compressive force with an intraoral sensor on the user;

transmitting a signal in response to the compressive force detected;

receiving the signal at a receiver;

based on the signal received by the receiver, identifying a location of the user; and receiving the signal from the intraoral sensor at a (UAV) unmanned vehicle, and activating the unmanned vehicle, such that the unmanned vehicle is guided to the location of the user.

* * * * *